US009751578B2

(12) United States Patent
Smith et al.

(10) Patent No.: US 9,751,578 B2
(45) Date of Patent: Sep. 5, 2017

(54) MOUNTING STRUCTURE WITH AMBULATING TRANSPORT SYSTEM

(71) Applicant: Entro Industries, Inc., Hillsboro, OR (US)

(72) Inventors: Shawn R. Smith, Hillsboro, OR (US); Harlan B. Smith, Beaverton, OR (US)

(73) Assignee: ENTRO INDUSTRIES, INC., Hillsboro, OR (US)

( * ) Notice: Subject to any disclaimer, the term of this patent is extended or adjusted under 35 U.S.C. 154(b) by 0 days.

(21) Appl. No.: 15/083,440

(22) Filed: Mar. 29, 2016

(65) Prior Publication Data

US 2016/0297488 A1 Oct. 13, 2016

Related U.S. Application Data

(60) Provisional application No. 62/144,265, filed on Apr. 7, 2015.

(51) Int. Cl.
*B60P 1/00* (2006.01)
*B62D 57/032* (2006.01)
*B60P 9/00* (2006.01)

(52) U.S. Cl.
CPC .............. *B62D 57/032* (2013.01); *B60P 1/00* (2013.01); *B60P 9/00* (2013.01)

(58) Field of Classification Search
CPC ......... B62D 57/02; B62D 57/032; B60P 1/00; B60P 9/00; B65G 7/02
See application file for complete search history.

(56) References Cited

U.S. PATENT DOCUMENTS

| 2,942,676 A | * | 6/1960 | Kraus | B62D 57/00 180/8.5 |
| 3,576,225 A | * | 4/1971 | Chambers | B65G 7/02 180/8.5 |

* cited by examiner

Primary Examiner — Mark Beauchaine
(74) Attorney, Agent, or Firm — Schwabe Williamson & Wyatt

(57) ABSTRACT

A load transporting apparatus includes a base structure that supports a load and a plurality of transport devices that move the base structure over a base surface. A first group of transport devices concurrently contact the base surface during a first movement step. Following the first movement step the first group of transport devices are disengaged from the base structure during a second movement step of the base structure. A second group of transport devices are disengaged from the base surface during the first movement step. Following the first movement step the second group of transport devices contact the base surface during the second movement step, and the weight of the load supported by the first group of transport devices is transferred from the first group of transport devices to the second group of transport devices.

20 Claims, 36 Drawing Sheets

MOUNTING STRUCTURE WITH AMBULATING TRANSPORT SYSTEM

RELATED APPLICATIONS

This application claims priority to U.S. Provisional Application No. 62/144,265, filed Apr. 7, 2015 and similarly entitled MOUNTING STRUCTURE WITH AMBULATING TRANSPORT SYSTEM, the contents of which are hereby incorporated by reference in their entirety.

FIELD OF THE INVENTION

This disclosure relates generally to apparatuses for transporting a load.

BACKGROUND

Moving extremely heavy loads has generally been a complicated task due to the large forces involved in lifting and transporting the heavy loads. When possible, large loads are often transported by disassembling or breaking up the load into multiple smaller loads. However, this break-down and subsequent reassembly process can be very time consuming, especially when a heavy load is only to be moved a small distance, or needs to be repositioned.

For heavy loads that require periodic adjustments over short distances, skid systems have been utilized, however these skid systems present problems. The skid systems generally involve elevating a heavy load with a group of jacks and pushing the load and the jacks down skids laid along the desired path of movement. The skid systems require that the ground over which the load is to be moved be substantially level to support the skids. As the load moves down the skid system, the skids over which the load has already passed are moved and placed in front of the direction of movement of the load, thereby costing additional time and labor. The frictional forces caused by pushing the load on the skids may result in the jacks breaking loose from the load due to the horizontal force placed on the jacks.

Further systems for moving heavy loads over short distances may include walking mechanisms that lift a load above the ground and transfer the load across the ground using the walking mechanisms. However, these prior systems may experience undue stresses and torques, and may require additional labor and time, to move the systems over uneven surfaces.

This application addresses these and other problems.

SUMMARY

Disclosed herein are various example load transporting apparatuses for moving a heavy load to a desired position through use of an ambulating transport system supporting the load. An example load transporting apparatus may be configured to maintain the load in an elevated position as the ambulating transport system moves the load across a base surface. The load transporting apparatus may comprise a plurality of transport devices configured to elevate the load, such that a base of the load is raised above the base surface. The plurality of transport devices may be segregated into lift zones and groups within the lift zones, where a first portion of the transport devices may be configured to contact the base surface during a movement phase while a second portion are elevated above the base surface. The portion of the transport devices in contact with the base surface may alternate between different portions of the transport devices to provide movement across the base surface.

In some example load transporting apparatuses, at least a portion of the transport devices may comprise transport devices configured to translate in the horizontal direction. During a movement phase of the load transporting apparatus, a first portion of the transport devices configured to translate in the horizontal direction may be in contact with the base surface, at which point travel mechanisms of the first portion may be actuated to provide movement across the base surface. The first portion may be removed from contact with the base surface by supporting the load on a second portion of the transport devices, allowing the first portion to enter a recovery phase. The second portion of the transport devices may be configured to further translate the load transporting apparatus in the horizontal direction across the base surface.

The load transporting apparatus may comprise transport devices that are segregated into lift zones. Within each lift zone, the transport devices may be further segregated into multiple groups of transport devices. Each lift zone may be assigned a lifting force based on determinate loading analysis. The groups of transport devices may be configured to provide the assigned lifting force for the associated lift zone when in contact with a base surface. The assigned lifting forces of each lift zone may be maintained as contact with the base surface transitions between the groups of transport devices within each lift zone.

DETAILED DESCRIPTION

Figure 1:
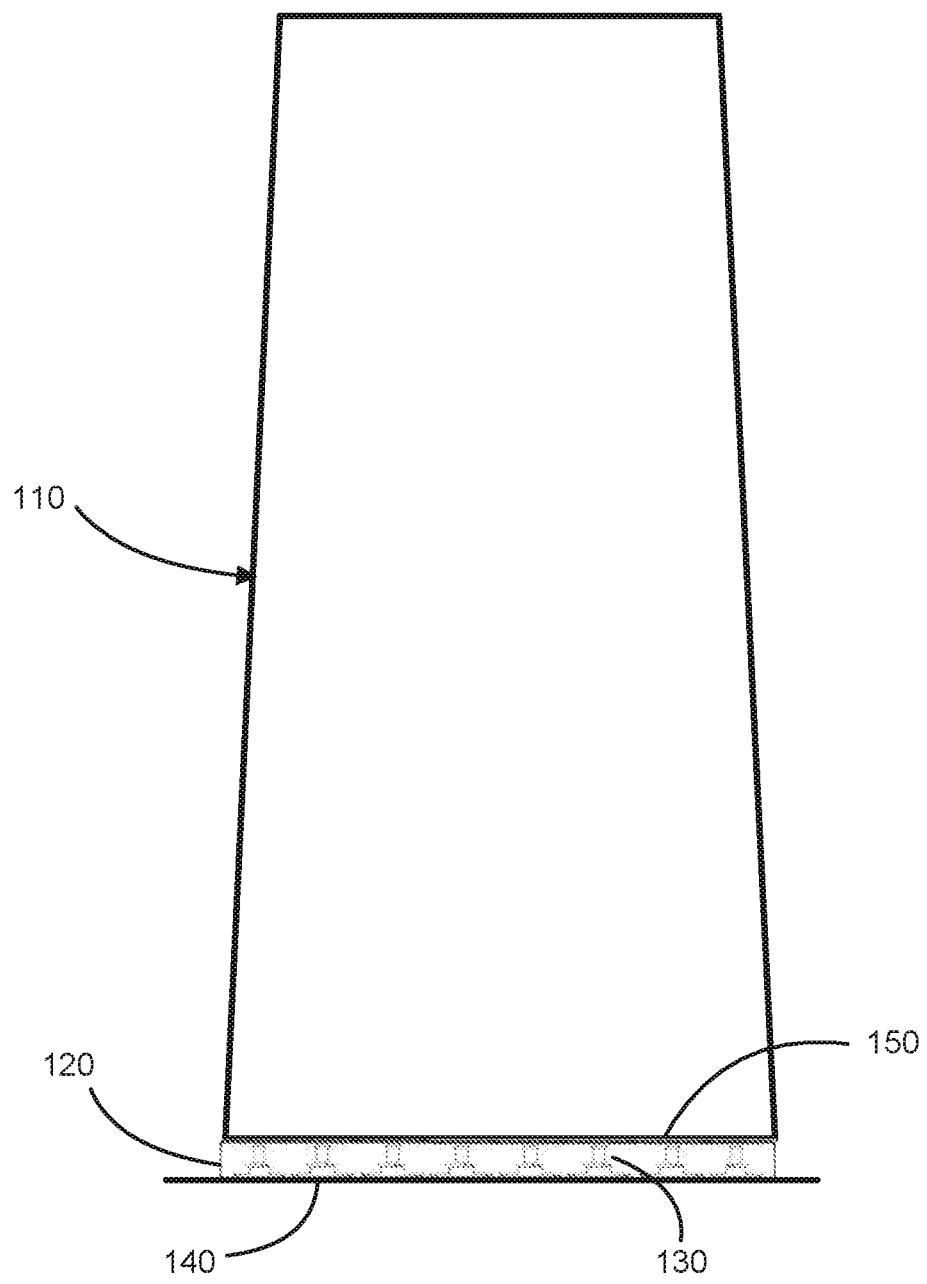
FIG. 1 illustrates a front view of an example ambulating transport system supporting a load.

FIG. 1 illustrates a front view of an example ambulating transport system 120 supporting a load 110. While the load 110 is illustrated as a tower, it should be understood that the load 110 is not limited to towers and may comprise any heavy load, such as oil rigs, windmills, and crane assemblies. Load 110 may be mounted on top of the ambulating transport system 120, which may support the load 110 on base surface 140. The ambulating transport system 120 comprises a plurality of transport devices 130 located within the ambulating transport system 120.

While FIG. 1 illustrates the load 110 being attached to the top of the ambulating transport system 120, it is to be understood that this is just one example of a configuration of the ambulating transport system 120. The ambulating transport system 120 may be attached to a base 150 of the load 110 or may be a separate structure that may be positioned under the load 110 and utilize gravitational and frictional forces to maintain the position of the load 110 on top of the ambulating transport system 120. While the ambulating transport system 120 is illustrated as extending underneath the load 110 for the length of the base 150 of the load 110, in other examples the ambulating transport system 120 may extend beyond an outer perimeter of the base 150, may be located entirely outside of the perimeter of the base 150, or may extend for a portion of the length of the base 150.

Figure 2:
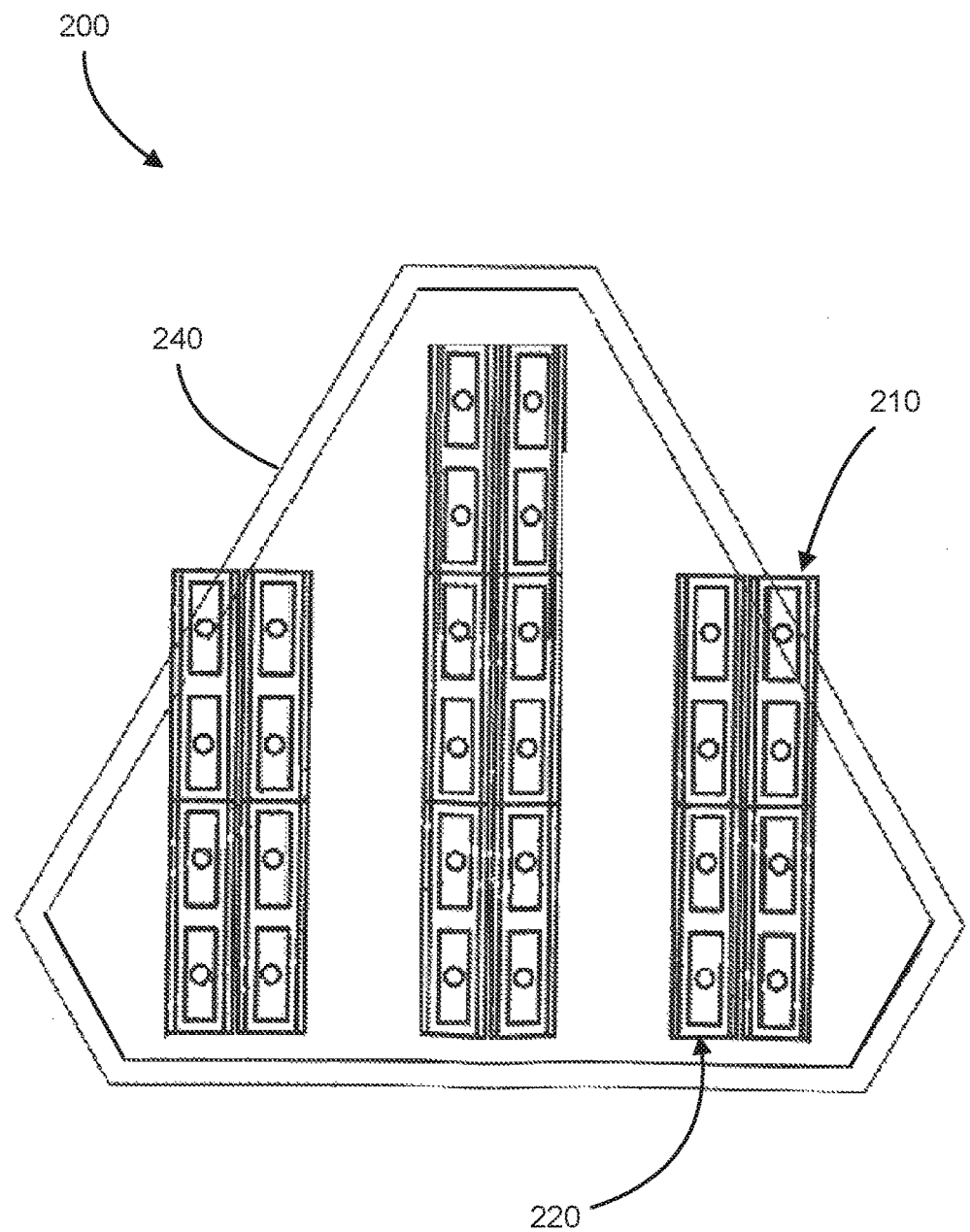
FIG. 2 illustrates a cross-sectional view of an example ambulating transport system.

FIG. 2 illustrates a cross-sectional view of an example ambulating transport system 200. The ambulating transport system 200 may comprise a mounting structure 240 extending around a perimeter of load 110 (FIG. 1) extending beneath load 110. The mounting structure 240 may extend in a substantially triangular shape along a perimeter of load 110 with one or more plates, cross beams, supports, other structural components, or any combination thereof, extending from the edges of the mounting structure 240 under the load 110.

A plurality of transport device supporting structures 210 may be attached to the mounting structure 240. The transport device supporting structures 210 may comprise three rows of transport device supporting structures 210 extending in a linear direction along base surface 140 (FIG. 1). In other examples, the transport device supporting structures 210 may comprise any number of rows and may extend in any direction or any shape along base surface 140.

A plurality of transport devices 220 may be attached to the transport device supporting structures 210 and may be configured to lift the transport device supporting structures 210 and the load 110 off the ground. The transport devices 220 may be located within the transport device supporting structures 210 and may be oriented in a single direction along the length of the transport device supporting structures 210. In other examples, portions of the transport devices 220 may be oriented in different directions. Further, the transport devices 220 may be located outside an outer perimeter of the transport device supporting structures 210.

Lifting and movement of heavy loads may cause stress and torque on a load that may result in damage to the load. In some examples, the mounting structure 240 of the ambulating transport system 200 and the transport devices 220 may be positioned to minimize the stress and torque on the load. Further, the mounting structure 240 and the transport devices 220 may be configured to compensate for stresses placed on the load by movement of the ambulating transport system 200.

Figure 3:
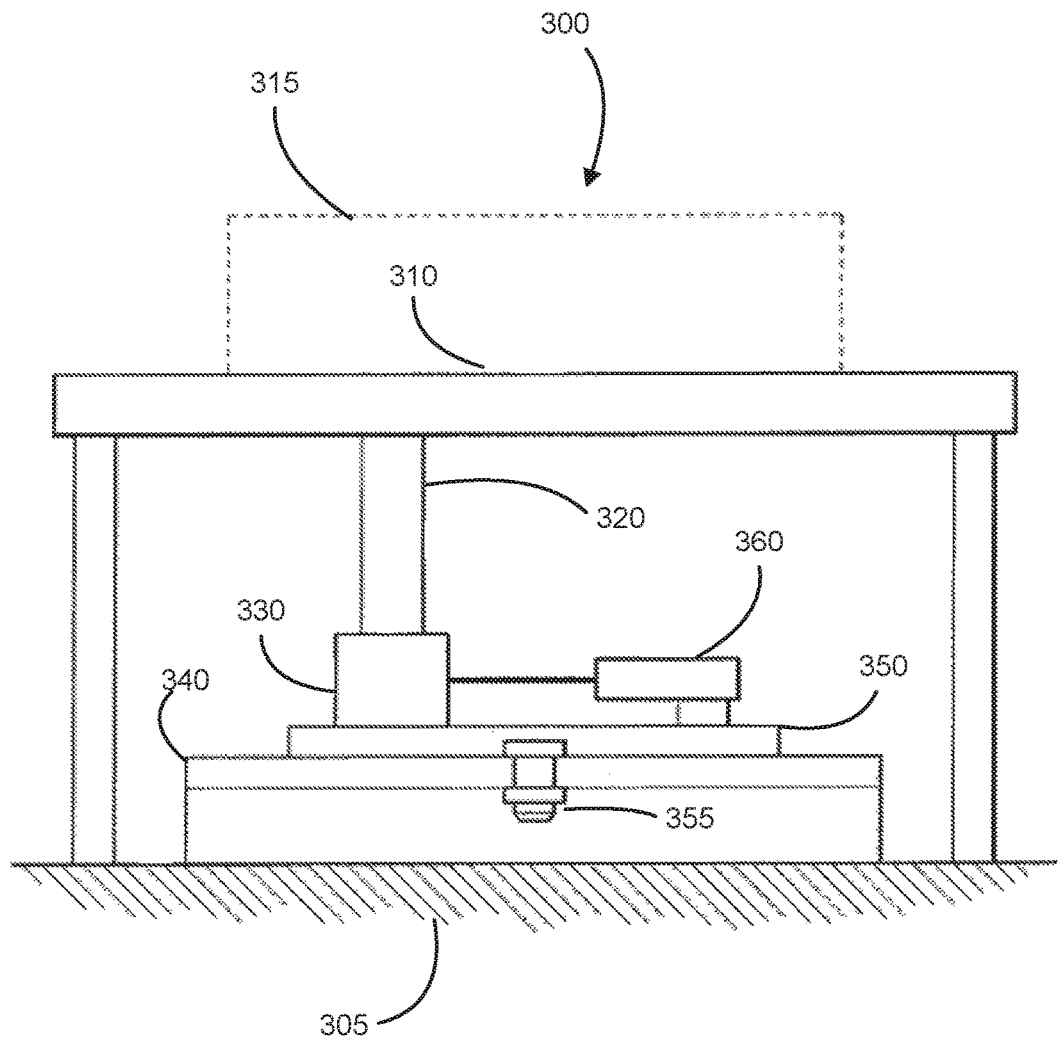
FIG. 3 illustrates a side view of an example transport device that may be incorporated within an ambulating transport system.

FIG. 3 illustrates a side view of an example transport device 300 that may be incorporated within an ambulating transport system. One skilled in the art will understand that this is only one example of a transport device that produces vertical and horizontal forces to move a load and that other transport devices that produce vertical and horizontal forces may be utilized by the ambulating transport system. In some examples, transport device 300 may be understood to operate similarly as one or more apparatuses disclosed by U.S. Pat. No. 8,573,334, entitled ROTATION DEVICE FOR LOAD TRANSPORTING APPARATUS, the contents of which are herein incorporated by reference in its entirety. Other transport devices that may be utilized by the ambulating transport system are disclosed in U.S. Pat. No. 8,561,733, entitled ALIGNMENT RESTORATION DEVICE FOR LOAD TRANSPORTING APPARATUS, U.S. Pat. No. 8,490,724, entitled CENTERING DEVICE FOR LOAD TRANSPORTING APPARATUS, U.S. Pat. No. 8,839,892, entitled CENTERING DEVICE FOR LOAD TRANSPORTING APPARATUS, U.S. application Ser. No. 14/028, 111, entitled ROTATION DEVICE FOR LOAD TRANSPORTING APPARATUS, and U.S. application Ser. No. 14/028,150, entitled ALIGNMENT RESTORATION DEVICE FOR LOAD TRANSPORTING APPARATUS, the contents of which are all herein incorporated by reference in their entireties.

Transport device 300 may be configured to move a load 315 over base surface 305 in one or more incremental steps, each including a load-movement phase and a recovery phase. Transport device 300 may include a lift mechanism 320 structured to lift a load-bearing frame 310 supporting load 315, and a roller assembly 330 coupled to the lift mechanism 320. A roller track 350 may be connected to the roller assembly 330 and configured to allow the roller assembly to move over the roller track in a first direction. The transport device 300 also may include a travel mechanism 360 coupled to the roller track 350 and connected to the roller assembly 330, the travel mechanism 360 may be structured to displace the roller assembly 330 relative to the roller track 350 along the first direction. A support foot 340 may also be included in the transport device 300. The support foot 340 may be positioned below the roller track 350, and may be structured to interface with the base surface 305. A pin connector 355 may be used to connect the support foot 340 with the roller track 350, and may be structured to allow the roller track 350 to rotate relative to the support foot 340.

In some examples, the roller track 350 may be separate from, but connected to, the support foot 340 that contacts the base surface 305. As described above, the support foot 340 may be connected to the roller track 350 with a pin connector 355, which allows the roller track to rotate relative to the support foot 340. This means that the support foot 340 may be oriented in a first direction while the roller track 350 is oriented in a second direction. As described in more detail below, this ability to vary the orientations of the roller track 50 and support foot 340 allows the transport device 300 to be precisely steered, which in turn allows a load 315 to be moved more efficiently between locations.

The pin connector 355 may comprise a king pin connector that allows rotation about an axis in one degree of freedom, while limiting movement in other planes of travel. The pin connector 355 may further include a bearing (not shown) to facilitate smooth rotational movements. However, because of the heavy weight associated with the loads 315 being moved by the walking apparatus 300, some examples do not have a bearing to prevent damage to the internal structure of a bearing.

Figure 4:
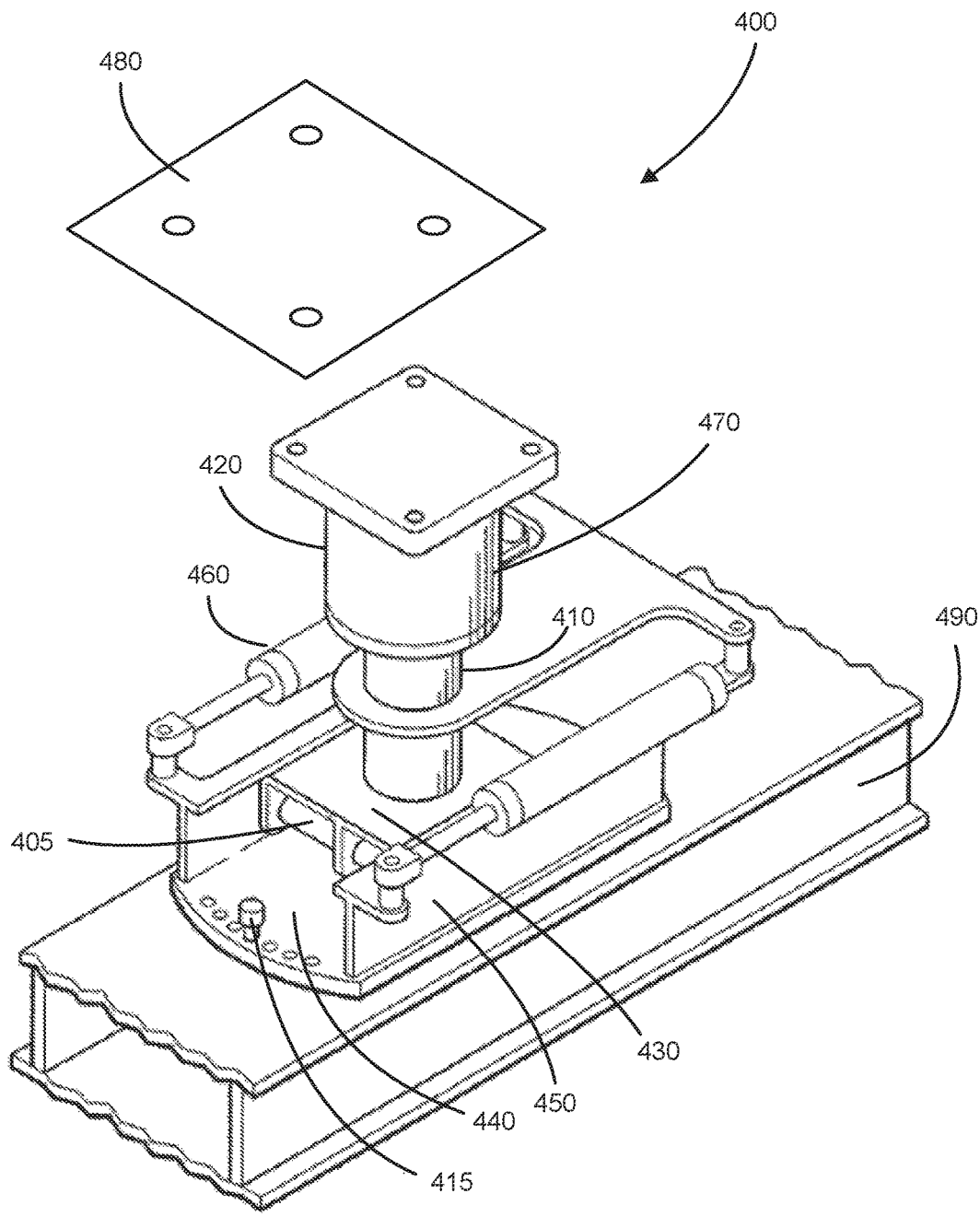
FIG. 4 illustrates a further example transport device that may be incorporated within an ambulating transport system.

FIG. 4 illustrates a further example transport device 400 that may be incorporated within an ambulating transport system. Transport device 400 may include a lift mechanism 420, a roller assembly 430, a roller track 450, and a support foot 490. The lift mechanism 420 may include a lift cylinder 470 suspended from a structural mounting pad 480. The structural mounting pad 480 may be utilized for attaching the transport device 400 to the ambulating transport system, may be a portion of the ambulating transport system to which the transport device attaches, or any combination thereof. The lift mechanism 420 may include a lift cylinder 470 that is connected to the structural mounting pad 480, and a cylinder rod 410 coupled to the roller assembly 430.

The cylinder rod 410 may be structured to allow the roller assembly 430 to rotate about a substantially vertical axis in the center of the cylinder rod 410. The connection between the roller assembly 430 and the cylinder rod 410 may be a bearing or one of a number of different connection variations. In some examples, the cylinder rod 410 may include a groove (not shown) around side edges of a lower portion of the cylinder rod 410, where the groove corresponds to a retainer cuff (not shown) of the roller assembly 430. In this example the retainer cuff is rotatable around the groove, but may easily be assembled or disassembled during installation, break-down, or transportation of an ambulating transport system.

Although the example illustrated in FIG. 4 shows the lift cylinder 470 connected to the structural mounting pad 480 and the cylinder rod 410 connected to the roller apparatus 430, in other examples, the cylinder rod 410 may be connected to the structural mounting pad 480, and the lift cylinder 470 may be connected to the roller apparatus 430. In these other examples, the lift cylinder 470 may be structured to allow the roller assembly 430 to rotate about a substantially vertical axis.

The transport device 400 may also include a travel mechanism 460 that is connected to the roller track 450 and coupled to the roller assembly 430 such that when the travel mechanism 460 is activated, the roller assembly 430 moves relative to the roller track 450. In the example shown in FIG. 4, the travel mechanism 460 includes two travel cylinders mounted on the roller track 450 on opposite sides of the roller track 450. Here, the travel cylinders of the travel mechanism 460 may balance the load being moved by the roller assembly 430 over the roller track 450. In other examples, one travel cylinder, or three or more travel cylinders may be used to move the roller assembly 430 relative to the roller track 450. In other embodiments, the travel mechanism 460 may include different movement structures, such as pulleys, levers, winches, tracks, etc. The roller assembly 430 may include a plurality of rollers or roller chain 405 that rotate as well as roll on the roller track 450. That is, in some examples, the roller assembly 430 may include a WBOT series roller assembly from Hilman Rollers. Due to the configuration of the roller chain 405 of the roller assembly 430 and the tolerance between the roller assembly 430 and the roller track 450 of the walking machine 400, the rollers of the roller chain 405 will typically be engaged with the roller track 450 during operation and use of the transport device 400.

As described above, the roller assembly 430 may be secured to the lower end of the cylinder rod 410, with the roller assembly 430 being captured within a U-shaped roller track 450 as shown in FIG. 4. The roller assembly 430 may be configured to roll along the bottom inside surface of the roller track 450 as well as along the underside of the two upper flanges of the roller track 450. The one or more travel cylinders 460 may be coupled between the cylinder rod 410 and the roller track 450. Accordingly, as will be understood from the more detailed discussion below, these travel cylinders 460 permit for the translation of the roller track 450 relative to the lift mechanism 420 and vice versa. The roller track 450 may be secured to an elongate support foot 490 via a rotational pin 415, which enables the roller track 450 to be rotationally positioned relative to the support foot 490 for steering of the transport device 400.

In some examples, the roller track 450 may include travel slots 440 structured to connect the roller assembly 430 to the roller track 450. Here, the travel slots 440 may be configured to allow substantially linear movement of the roller assembly 430 across the roller track 450.

A transport device 400 may include one or more linking devices coupled to the support foot 490. One or more biasing devices may be coupled to the linking devices, where the biasing devices are structured to become activated during a load-movement phase when the roller assembly 430 travels in a direction that is not parallel or perpendicular to a lengthwise direction that the support foot 490 is oriented, and structured to return the support foot to an aligned position relative to the structural mounting pad 480 during a recovery phase.

In some examples, the one or more biasing devices may become activated when an angular displacement occurs between the support foot 490 and the structural mounting pad 480, where the activation of the one or more biasing devices includes a torquing force being applied to the one or more biasing devices. In other examples, the linking devices may be structured to be connected to at least one other transport device.

A transport device 400 may include one or more guide devices positioned adjacent to the roller assembly 430, and one or more biasing devices coupled to the guide devices. Here, the biasing devices may be structured to become deflected during a load-movement phase when the roller assembly 430 travels in a direction that is not parallel or perpendicular to a lengthwise direction that the support foot 490 is oriented, and structured to return the support foot 490 to a centered position relative to the support foot 490 during a recovery phase.

Figure 5:
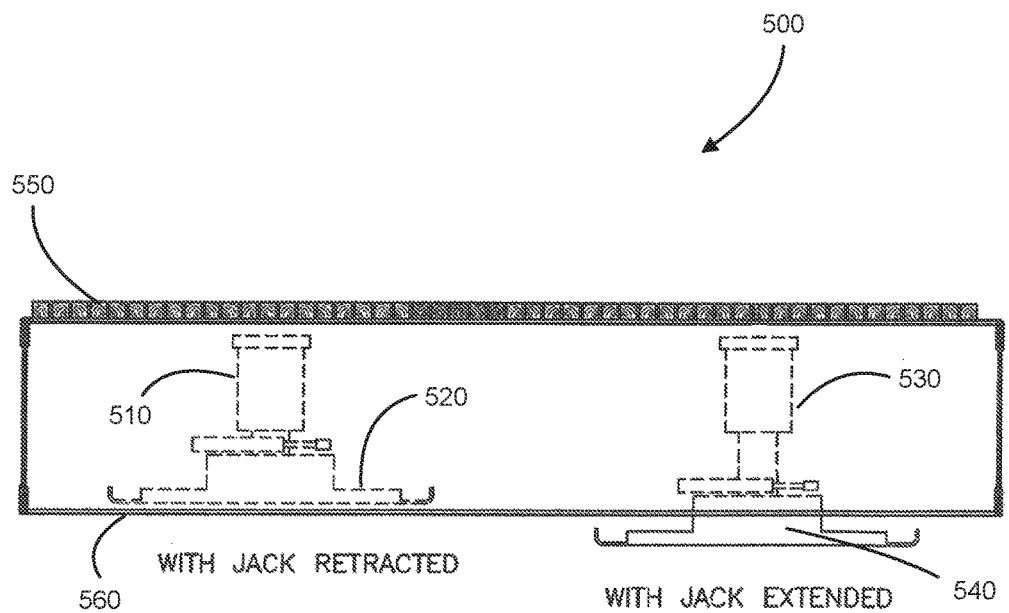
FIG. 5 illustrates a cross-sectional view of an example ambulating transport system with amounting structure including a retracted transport device and an extended transport device.

FIG. 5 illustrates a cross-sectional view of an example ambulating transport system 500 with a mounting structure 550 including a retracted transport device 510 and an extended transport device 530. The mounting structure 550 may include a bottom edge 560 which is configured to support the mounting structure 550 and corresponding load on a base surface when the transport devices are in a retracted state.

Retracted transport device 510 and extended transport device 530, collectively referred to as transport devices, reside within the mounting structure 550 and may be surrounded by the mounting structure 550 with the exception of the bottom of the mounting surface 550, thereby allowing the transport devices to extend downward. In other examples, the mounting structure 550 may surround the transport devices on fewer sides than illustrated. In some examples where a bottom edge 560 of a mounting structure 550 does not extend below retracted support foot 520 in the fully retracted position, the mounting structure 550 may be fully supported by the transport devices on a base surface.

Retracted transport device 510 is illustrated in a fully retracted position. The retracted support foot 520 may reside above the bottom edge 560 of the mounting structure 550 when the retracted transport device 510 is in the fully retracted position. With the retracted transport device 510 in the fully retracted position the bottom edge 560 of the mounting structure 550 may contact a base surface and support the mounting structure 550 on the base surface. The retracted support foot 520 may reside above the base surface and may freely move in either horizontal direction.

Extended transport device 530 is shown in a fully extended position. In an extended position, the extended support foot 540 may extend below the bottom edge 560 of the mounting structure 550, thereby supporting the mounting structure 550 on the extended support foot 540 and lifting the bottom edge 560 off of the base surface. With extended transport device 530 in the extended position, any horizontal translation results in movement of the mounting structure 550 in a horizontal direction. It should be understood that the transport devices may reside in positions intermediate the fully retracted and fully extended position.

Figure 6:
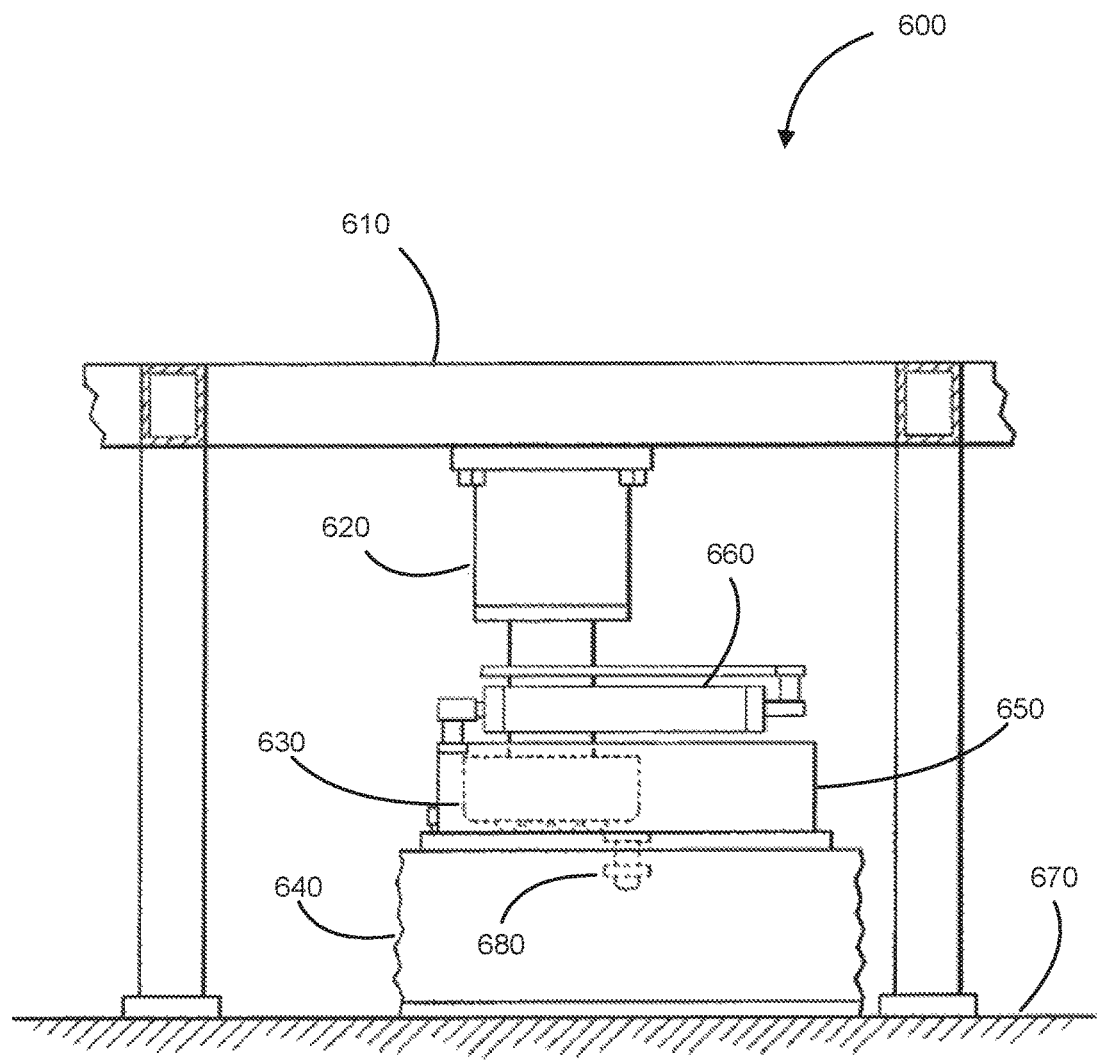
FIG. 6 illustrates a first step of a walking cycle of an example transport device utilized by an ambulating transport system.

FIGS. 6, 7, 8, 9, and 10 illustrate an example walking cycle of a transport device 600 that may be utilized by the ambulating transport system. FIG. 6 illustrates a first step of a walking cycle of an example transport device 600 utilized by an ambulating transport system. Transport device 600 includes a support foot 640 positioned on base surface 670 and connected to roller track 650 via a rotation pin 680. The roller track 650 may be structured to allow roller assembly 630 to move relative to the roller track 650 when activated by a travel mechanism 660, which may comprise one or more travel cylinders. A lift mechanism 620 may be connected between the roller assembly 630 and load-bearing frame 610. As shown in FIG. 6, the transport device 600 may be located in an operational position where it is both connected to the load-bearing frame 610 and positioned on the base surface 670.

Figure 7:
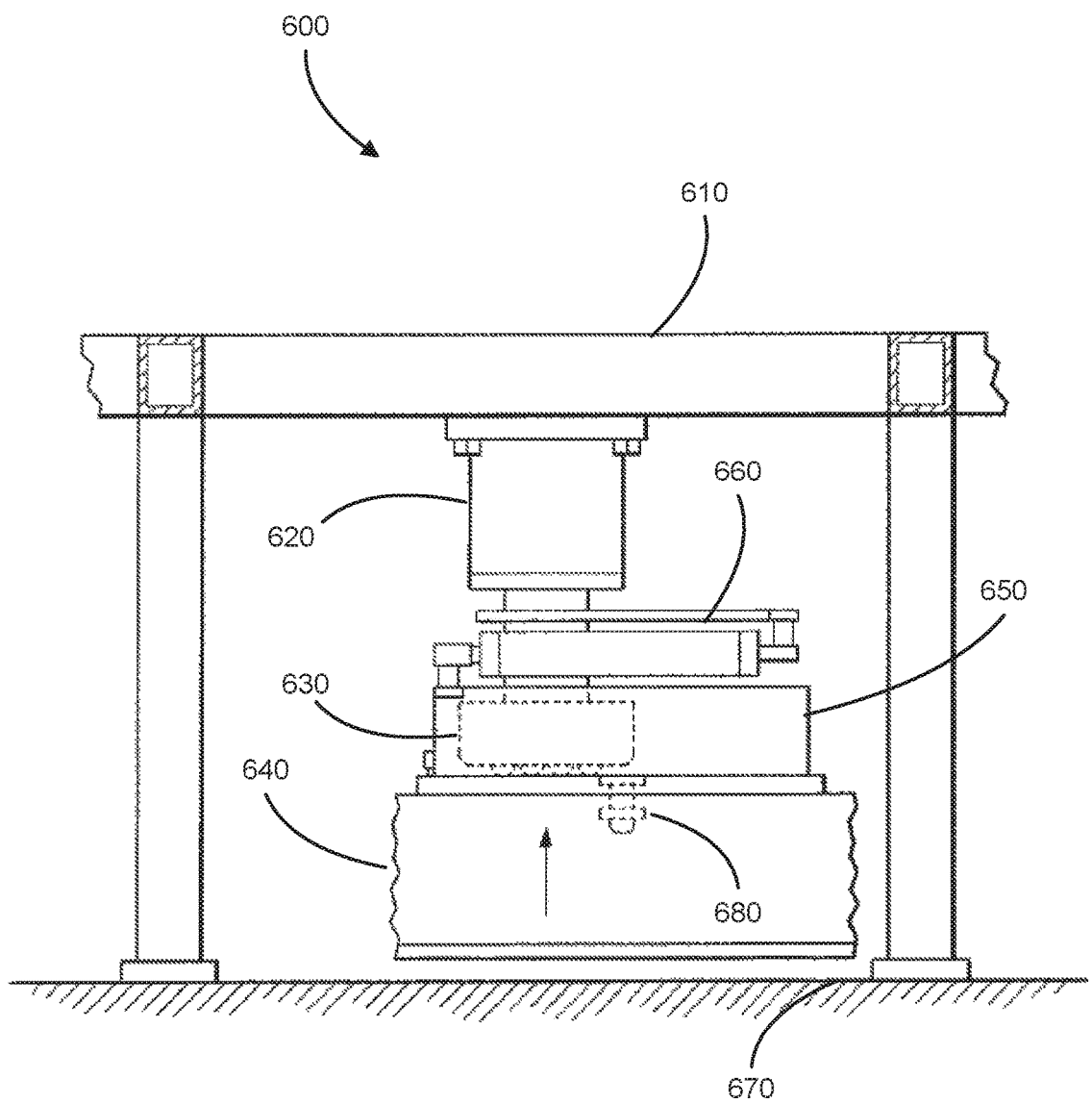
FIG. 7 illustrates a second step of the walking cycle of the example transport device of FIG. 6.

FIG. 7 illustrates a second step of the walking cycle of the example transport device 600 of FIG. 6. Specifically, as indicated by the vertical arrows pointing up, when the lift mechanism 620 is activated, the roller assembly 630, the roller track 650, and the support foot 640 may be lifted above the base surface 670 as a single unit. This is due in part to the roller assembly 630, which is secured to the lower end of the lift mechanism 620, being captured by the roller track 650, as described above.

Figure 8:
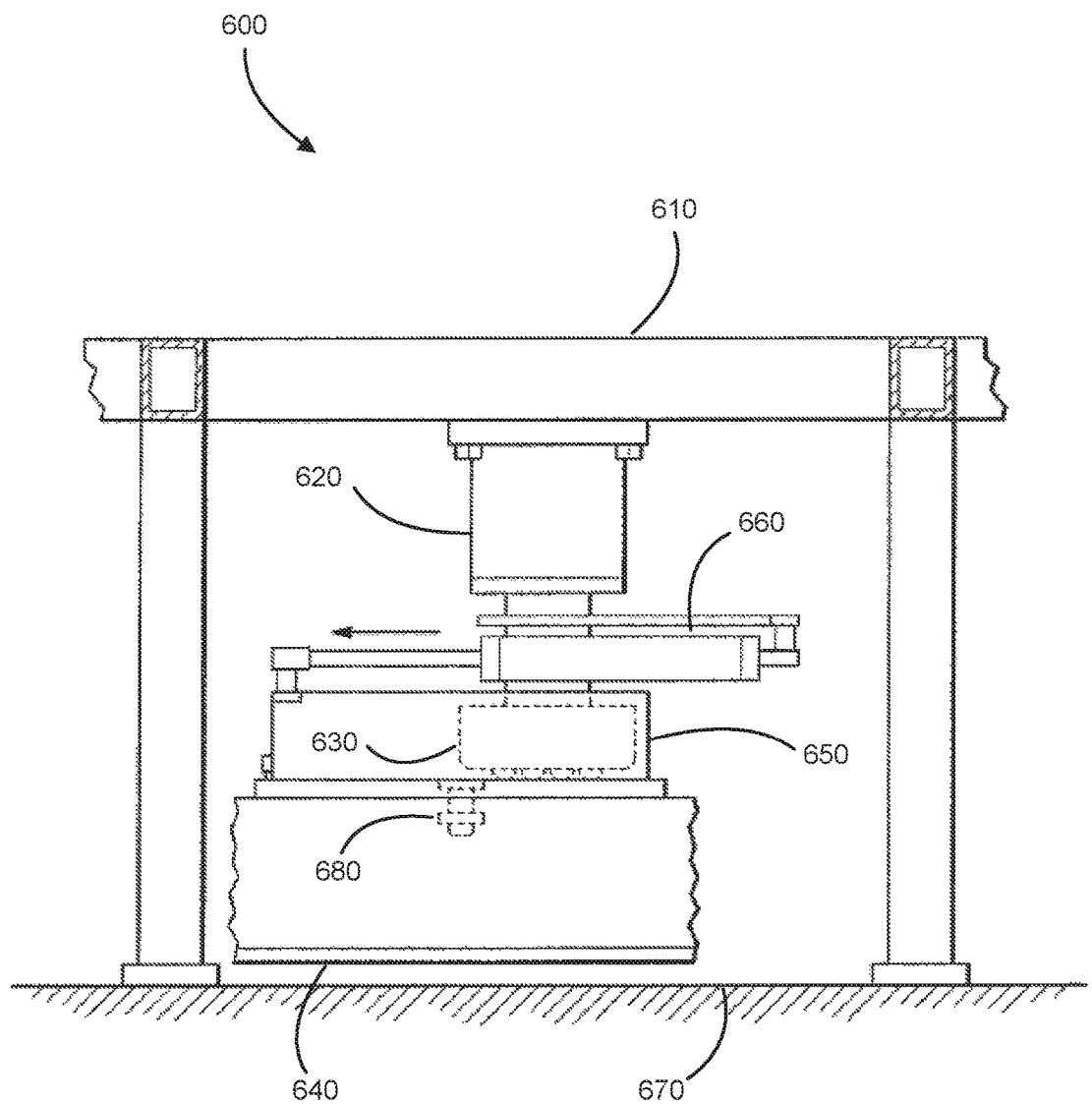
FIG. 8 illustrates a third step of the walking cycle of the example transport device of FIG. 6.

FIG. 8 illustrates a third step of the walking cycle of the example transport device 600 of FIG. 6. Here, as indicated by the horizontal arrow pointing to the left, the travel cylinders 660 may be extended to shift the roller track 650 to the left along the roller assembly 630. Because the roller track 650 is secured to the support foot 640 via the rotation pin 680, the support foot 640 also may be shifted to the left. The distance of travel of the support foot 640 may be limited by the operable travel, or throw, of the travel mechanism 660. Because the horizontal travel is limited, the roller tracks 650 only need to be long enough to accommodate the corresponding distance traveled by the roller assembly 630. As illustrated in FIG. 8, this step may occur while the support foot 640 is lifted completely off of the base surface 670, and with the full weight of the load being supported by the load-bearing frame 610 and its ground-engaging portions. In some examples, the third step may occur when a sufficient amount of the weight has transitioned from the support foot 640 to the load bearing frame 610, such that the support foot 640 may move while remaining in contact with the base surface 670 (e.g., the support foot 640 may slide across the base surface 670).

Figure 9:
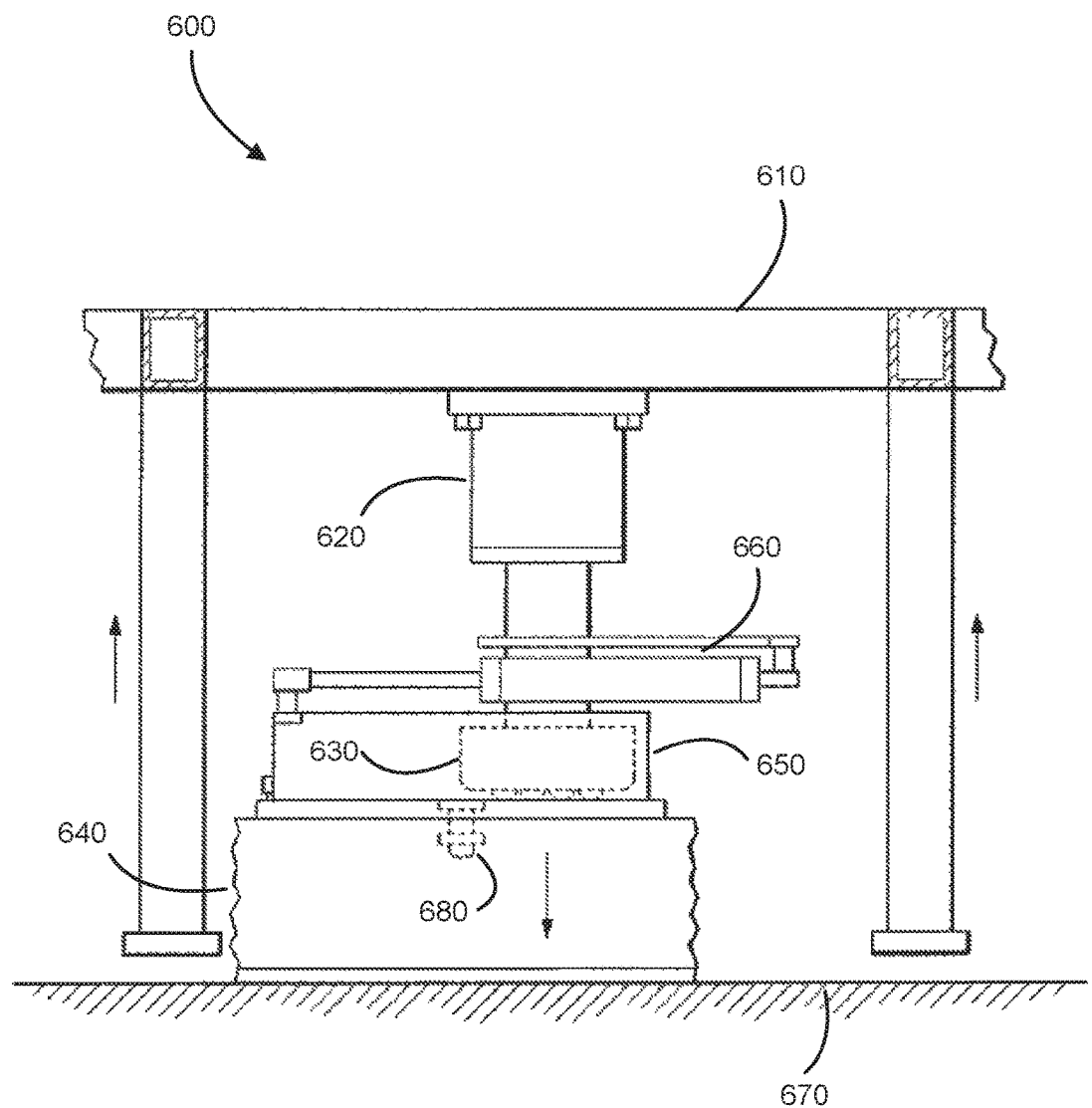
FIG. 9 illustrates a fourth step of the walking cycle of the example transport device of FIG. 6.

FIG. 9 illustrates a fourth step of the walking cycle of the example transport device 600 of FIG. 6. Here, the lift mechanism 620 may be activated (i.e., the cylinder rod of the transport device is forced out of the lift cylinder) causing the support foot 640 to engage the base surface 670. As the lift mechanism 620 continues to operate, the ground-engaging portions of the load-bearing frame 610 may be lifted off of the base surface 670, so that the entire weight of the load is then supported by the support foot 640.

Figure 10:
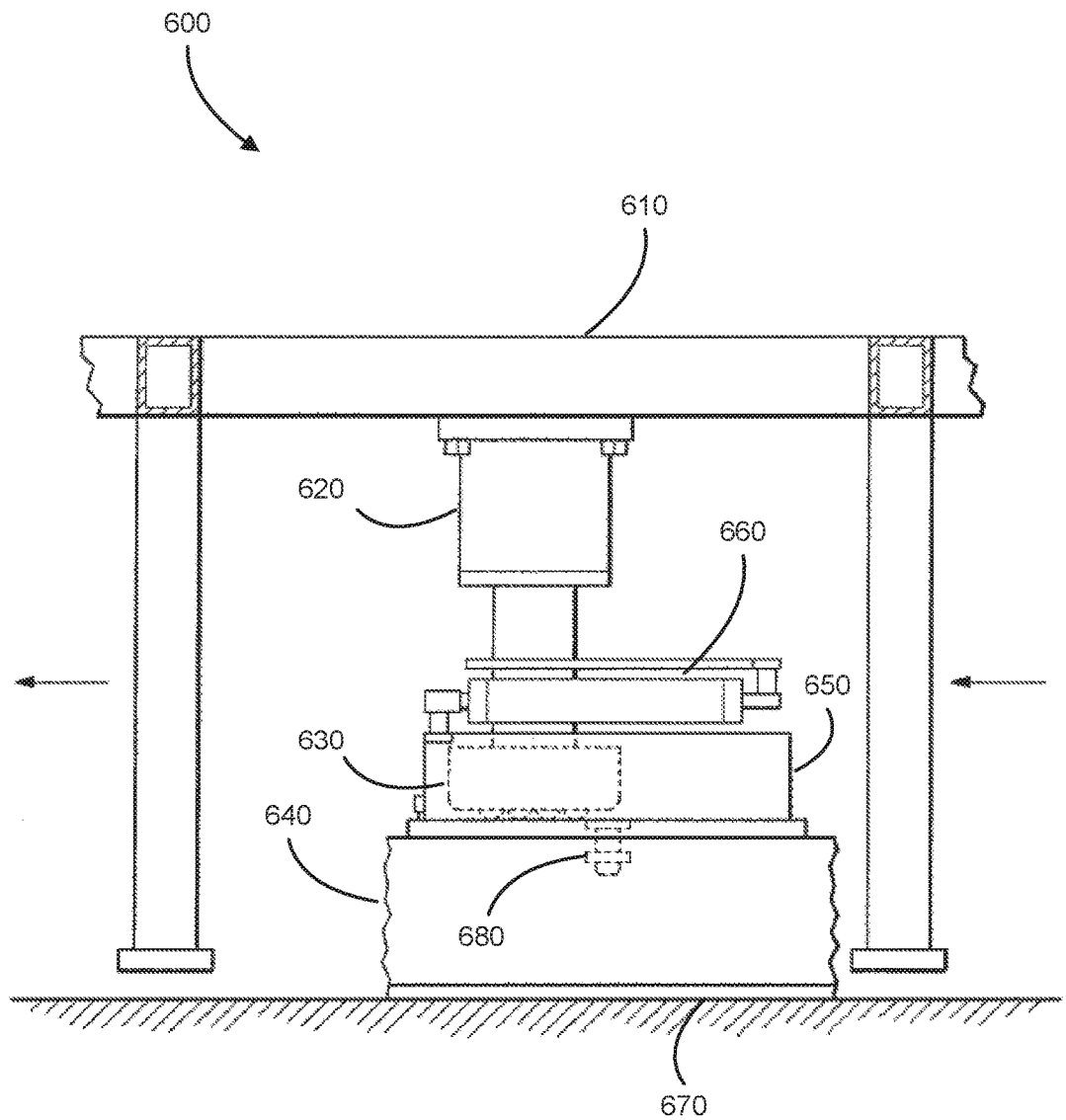
FIG. 10 illustrates a fifth step of the walking cycle of the example transport device of FIG. 6.

FIG. 10 illustrates a fifth step of the walking cycle of the example transport device 600 of FIG. 6. While the load-bearing frame 610 is lifted off of the base surface 670, and the support foot 640 is supporting the load, the travel mechanism 660 may be retracted, causing the entire load-bearing frame 610, including the supported load, to translate to the left, as indicated by the horizontal arrows pointing to the left in the view shown in FIG. 10. As shown in this figure, the load-bearing frame 610 has shifted to the left away from its starting position, a distance corresponding to the operable throw of the travel mechanism 660. During this translation to the left, the roller assembly 630 rolls along the bottom inside surface of the roller track 650. The walking process of the transport device 600 may continue by repeating the steps illustrated in FIGS. 7-10. Accordingly, cycling through the above illustrated sequential steps may cause the transport device 600 to walk across the base surface 670.

Figure 11:
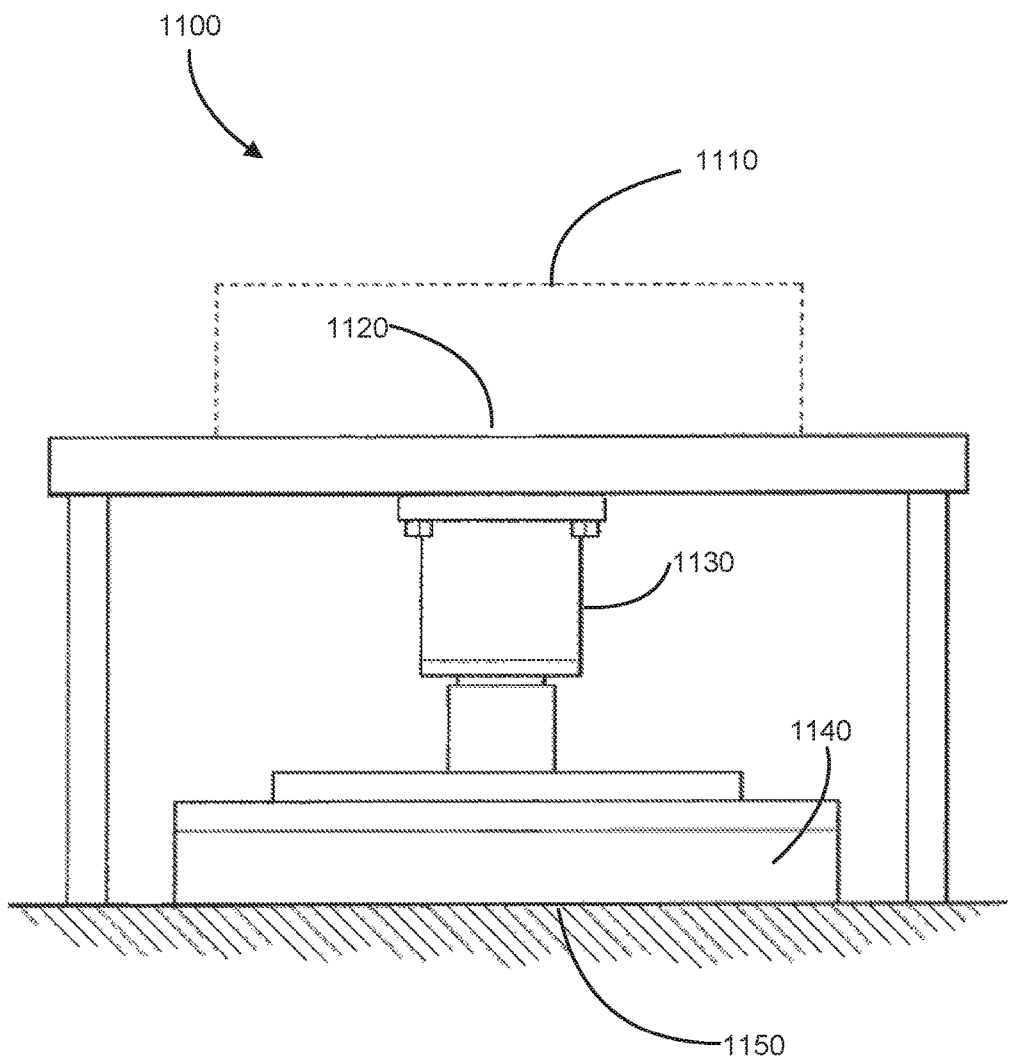
FIG. 11 illustrates an example vertical lift device that may be utilized by an ambulating transport system.

FIG. 11 illustrates an example lift device 1100 that may be utilized by an ambulating transport system. Lift device 1100 may comprise a load-bearing frame 1120 on which a load 1110 may be supported. A lift mechanism 1130 provides actuation of the lift device 1100 in a vertical direction, such that the lift device 1100 may be extended and retracted in the vertical direction. A support foot 1140 may reside at a bottom of the lift mechanism 1130, where the support foot 1140 is configured to contact a base surface 1150 when the lift device 1100 is extended and, in response, the load-bearing frame 1120 may be lifted out of contact with the base surface 1150.

Figure 12:
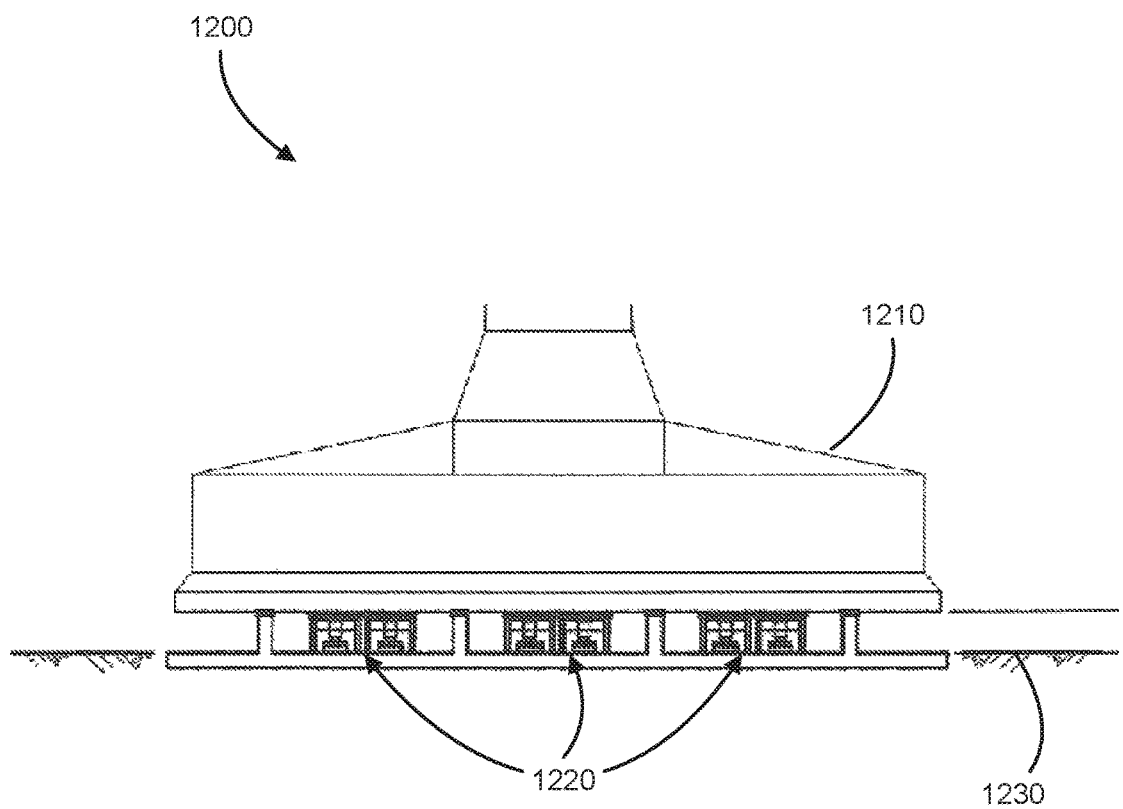
FIG. 12 illustrates a side view of a lift pad structure that may be utilized by an ambulating transport system.

FIG. 12 illustrates a side view of a lift pad structure 1200 that may be utilized by an ambulating transport system. In some examples, the lifting devices 1220 may be mounted to a foot 1210 of the lift pad structure 1200. The plurality of transport devices 1220 may be segregated into different sections of the foot 1210 and may interface with a base surface 1230. The plurality of transport devices 1220 may comprise one or more of the transport devices described throughout the disclosure.

Figure 13:
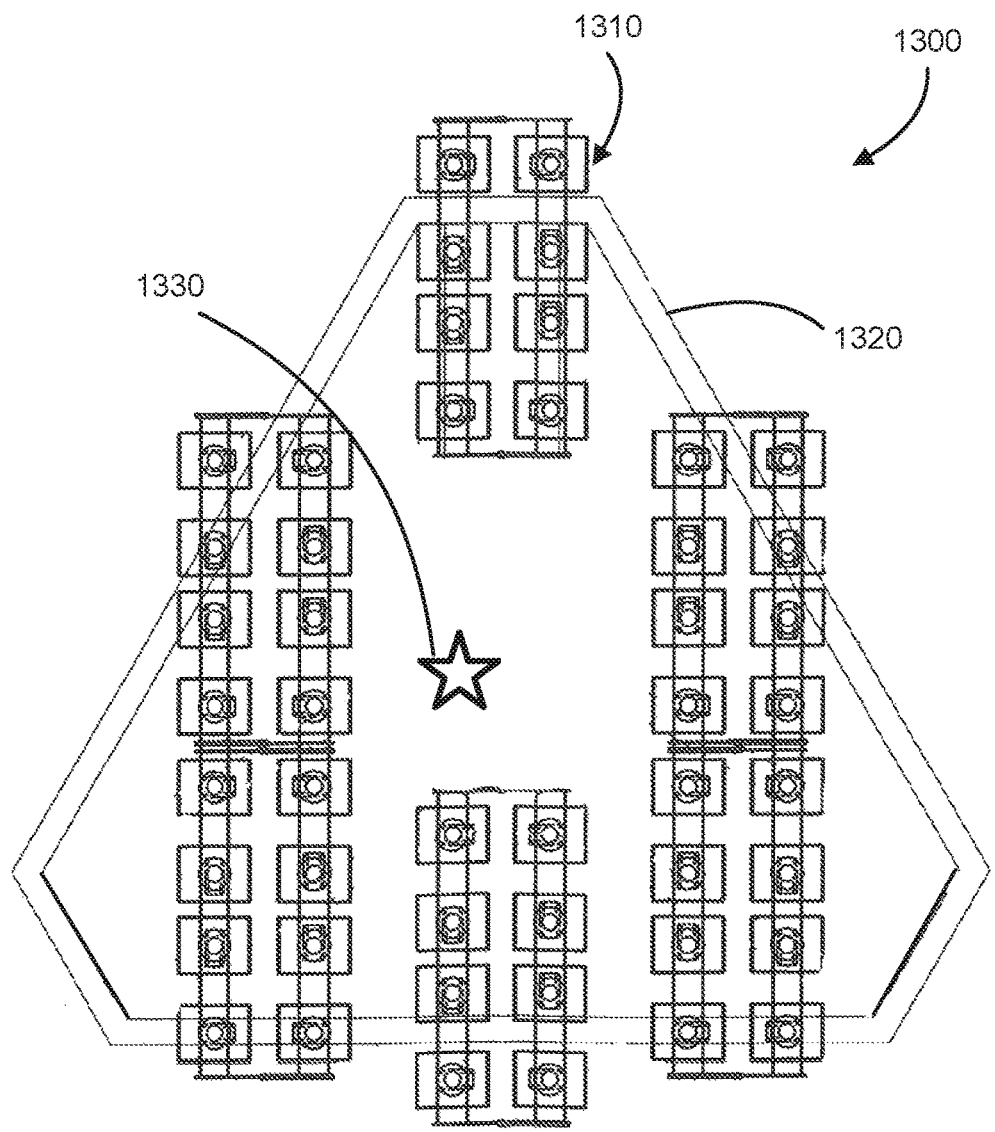
FIG. 13 illustrates a cross-sectional view of an example ambulating transport system with transport devices arranged in a mounting structure of the ambulating transport system.

FIG. 13 illustrates a cross-sectional view of an example ambulating transport system 1300 with transport devices 1310 arranged in a mounting structure 1320 of the ambulating transport system 1300. Ambulating transport system 1300 may comprise transport devices 1310 arranged in rows along a bottom of the mounting structure 1320. It is to be understood that the arrangement of the transport devices 1310 may vary in other examples. In some examples, the transport devices 1310 may be arranged to minimize any stress or torque that may be placed on the mounting structure 1320 or any load placed on the mounting structure 1320 that may occur during lifting, movement, or support of the mounting structure 1320 by the transport devices 1310.

FIG. 13 further illustrates a center of gravity 1330 of a load and the mounting structure 1320 in the ambulating transport system 1300. In some examples, the center of gravity 1330 may be utilized in designing the mounting structure 1320 and/or selecting the arrangement of the transport devices 1310. The center of gravity 1330 may be utilized in performing determinate loading analysis of the ambulating transport system 1300.

Figure 14:
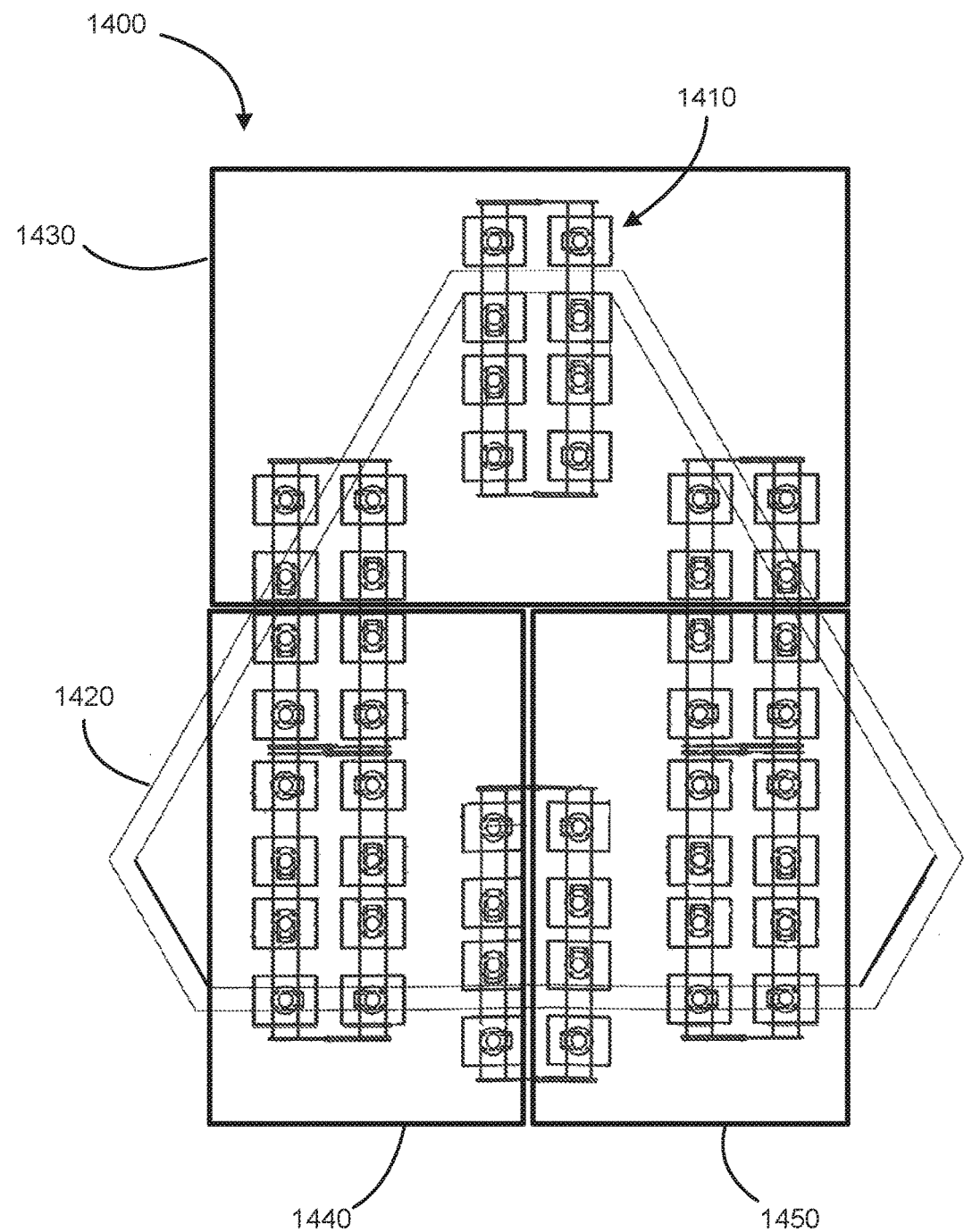
FIG. 14 illustrates an example ambulating transport system with transport devices segregated into lift zones.

FIG. 14 illustrates an example load transporting apparatus or ambulating transport system 1400 with a plurality of transport devices 1410 distributed, segmented, and/or segregated into three or more lift zones of a base or mounting structure 1420. For example, transport devices 1410 may be segmented into three lift zones including a first lift zone 1430, a second lift zone 1440, and a third lift zone 1450. While the illustrated example shows equal amounts or numbers of transport devices 1410 in each of the lift zones, in other examples the number of transport devices 1410 in each lift zone may vary between the lift zones. Additionally, while three lift zones are illustrated, the transport devices 1410 may be segmented into more or less lift zones than the three zones illustrated.

The lift zones may be arranged in many different ways relative to the transport devices 1410 or the mounting structure 1420. Further, the segmentation of the lift zones may be based on any or all of a design of the mounting structure 1420, an arrangement of the transport devices 1410, the characteristics of the transport devices 1410 (such as the amount of lift each transport device 1410 may provide), and the center of gravity 1330 (FIG. 13).

In some examples, the three lift zones 1430, 1440, 1450 may be configured to provide mounting structure 1420 with a three-point support base. One or all three of the lift zones 1430, 1440, 1450 may be actuated to adjust the position, angle, or height of mounting structure 1420. In some examples, a mounting structure may comprise four lift zones that provide a four-point support base. By way of simple illustration, providing three or four lift zones to the mounting structure may be represented by a chair or stool supported by three or four legs, respectively. In some example mounting structures, the relative height of each lift zone, or leg, may be separately adjusted.

The plurality of transport devices 1410 may be operably coupled to the support structure 1420 and be configured to move the support structure over a base surface, such as base surface 140 (FIG. 1), which may comprise the ground, a platform, a mat, or other type of surface.

The plurality of transport devices 1410 may comprise a first group of transport devices distributed between the three or more lift zones 1430, 1440, 1450. Additionally, the plurality of transport devices 1410 may comprise a second group of transport devices distributed between the three or more lift zones 1430, 1440, 1450. In some examples, each of the three or more lift zones 1430, 1440, 1450 may be assigned a lifting force that collectively supports the weight of the load, and the assigned lifting force of each lift zone may be approximately maintained as the weight of the load is transferred from the first group of transport devices to the second group of transport devices.

During operation, each of the lift zones of the ambulating transport system 1400 may be configured to lift the mounting structure 1420 a predetermined distance. Initially, the transport devices 1410 in each of the zones may be extended to a position where each of the lift zones are at the verge of lifting the mounting structure 1420. Once the mounting structure 1420 is on the verge of being lifted, the transport devices 1410 in each zone may be actuated to lift the mounting structure 1420 the predetermined distance.

Actuating the transport devices 1410 to lift the mounting structure 1420 the predetermined distance may comprise controlling a volume of liquid, such as oil, or gas provided to the transport devices 1410. Once the mounting structure 1420 is on the verge of being lifted, a set volume of the liquid or gas corresponding to the predetermined distance may be pumped into each of the lift zones. Equal amounts of the liquid or gas may be pumped into each of the lift zones, which may cause all of the transport devices 1410 to extend the same amount in response to receiving the liquid or gas. By extending the same amount, the mounting structure 1420 may maintain the location of the center of gravity of the load in relation to the mounting structure 1420 and/or may maintain the slope, or lack thereof, of the mounting structure 1420.

The transport devices 1410 within a lift zone may be connected by a shared distribution system providing the liquid or gas. The shared distribution system may allow the liquid or gas to automatically distribute among the transport devices 1410 to provide equal lift force exerted by each transport device 1410 within the lift zone.

While the volume of the liquid or gas provided to each of the lift zones may be equal, the pressure required to pump the liquid or gas into the different lift zones may vary. The center of gravity of the load supported by the mounting structure 1420 may be offset from the center of the mounting structure 1420 toward one or more of the lift zones. Due to the center of gravity of the load being offset, one or more of the lift zones toward which the center of gravity is located may be subject to a greater force applied by the load than the other lift zones. To compensate for this greater force, greater pressure may be applied for pumping the same volume of the liquid or gas into the lift zones. The additional pressure for pumping the liquid or gas may be provided to one or more the lift zones on demand.

In some examples, the lifting zones may be provided with different amounts of liquid or gas during actuation. A greater amount of oil or gas may be provided to one or two of the lifting zones causing the lifting zones receiving the greater amount of oil or gas to lift the mounting structure 1420 a greater distance than the lift zones that receive less of the oil or gas. This may be useful when the mounting structure 1420 is setting on a surface that is not level and it would be beneficial to level the mounting structure 1420 prior to transporting a load supported on the mounting structure 1420.

While the actuation has been described using oil or gas, it is to be understood that the actuation may occur through other means, such as mechanical and/or electrical means. Once the mounting structure 1420 is on the verge of being lifted, an amount of mechanical and/or electrical actuation may be controlled to lift the mounting structure 1420 the predetermined distance.

In some examples, each lift zone of the ambulating transport system 1400 may be assigned an amount of lift force to be provided when the transport devices 1410 in a corresponding lift zone are actuated. The amount of lift force may be based on some or all of a weight of the load including the mounting structure 1420, the arrangement of the transport devices 1410, and the center of gravity 1330 (FIG. 13). For example, if the center of gravity is located above second zone 1440, second zone 1440 may be assigned a greater amount of lift force than first zone 1430 and third zone 1450, respectively. Further, the amount of lift force may be assigned to minimize any stress or torque that may act upon mounting structure 1420 or any load supported on mounting structure 1420 during supporting and movement of the ambulating transport system 1400 by the transport devices 1410.

In some examples, the amount of lift force provided may be divided equally between the transport devices 1410 in the lift zone, whereby all the transport devices 1410 in a lift zone may provide the same amount of lifting force. In other examples, the transport devices 1410 within a lift zone may each provide different portions of the lift force either through manual assignment of lift forces to each transport device 1410 or through automatic means.

In some examples, a combination of the lift forces of each of lift zones may combine to provide support of the mounting structure 1420 at the center of gravity of the load 1330 (FIG. 13). This may provide for less stress and torque on the load and the mounting structure when moving the load.

Figure 15:
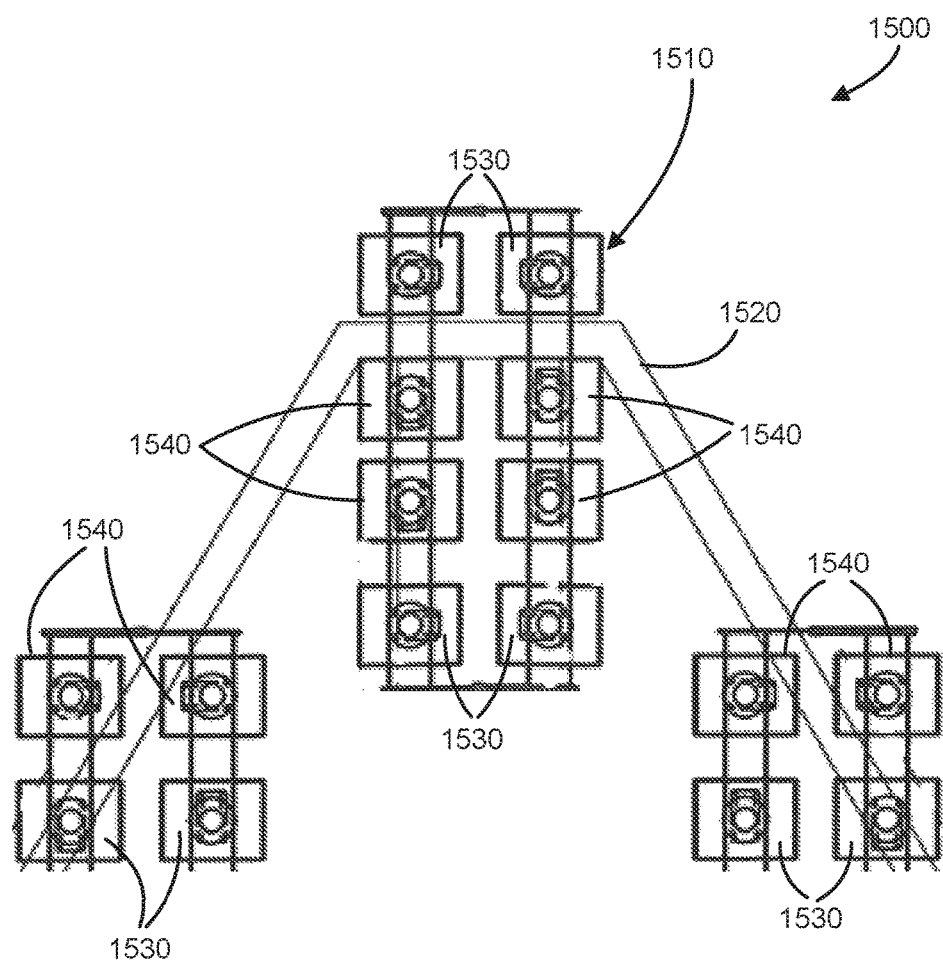
FIG. 15 illustrates a lift zone of an example ambulating transport system with transport devices segregated into groups of the transport devices.

FIG. 15 illustrates a lift zone 1500 of an example ambulating transport system with transport devices 1510 segregated into groups of transport devices. In some examples, lift zone 1500 may comprise a first lift zone for a base or mounting structure comprising three or more lift zones, such as illustrated in FIG. 14.

A first group of transport devices 1530 may be configured to be actuated during a certain time, while a second group of transport devices 1540 may be actuated during a different time. In some examples, the first group 1530 and the second group 1540 may continually alternate actuation creating a continuous walking cycle of the ambulating transport system, wherein a mounting structure 1520 and load are supported above a base surface for the extent of a movement between a starting point and an end point. The alternating actuation may result in actuation of the transport devices 1510 such that as the horizontal translation caused by the first group 1530 is completing, the horizontal translation caused by the second group 1540 is beginning.

Further, in some examples, the extension, retraction, and/or translation of the transport devices in both the vertical and horizontal directions may occur at different rates, including at different points during the walking cycle between locations. For instance, when starting and stopping, the rate of translation in the horizontal direction may be slow to prevent quick jolts. In-between the starting and stopping movement, the rate of extension in the horizontal direction may be relatively faster to expedite movement of the mounting structure.

In some examples, actuation of a group of the transport devices 1510 may occur in response to providing a liquid, such as oil, or a gas to the group of transport devices 1510. All the transport devices 1510 within a group, such as first group 1530, may be connected to a pump and hoses for providing liquid or gas to the transport devices 1510, such that all the transport devices 1510 within a group receive liquid or gas from the pump. Each group may be connected to control valves corresponding to each group that control the flow of liquid or gas for actuation of the transport devices 1510. In some examples, there may be multiple pumps connected to each of the groups. The amount of liquid or gas provided to a group may be based on a pressure necessary to provide the lift force assigned to a lift zone associated with the group. For example, if lift zone 1500 is assigned a lift force of 10,000 tons, a liquid or gas pressure corresponding to 10,000 tons of force may be provided to the transport devices 1510 of first group 1530 for lifting a load when the first group 1530 is actuated and to the second group 1540 when the second group 1540 is actuated.

In some examples, by providing liquid or gas to all of the transport devices 1510 within first group 1530 through a shared distribution system, the liquid or gas may automatically distribute among the transport devices to provide equal lift force by each transport device, thereby compensating for different extensions of the transport devices 1510. The liquid or gas may continuously transfer between the transport devices 1510 within the first group 1530 and the second group 1540, such that the load placed on each transport device 1510 is equalized automatically through the lifting and movement of the mounting structure 1520 by the group. In some examples, the transport devices may be configured to have an equal pressure per square inch that may be achieved through the equalization process. Further, liquid or gas may be added or removed from the group automatically in order to maintain a pressure corresponding to an assigned lift force.

It is to be understood that more or less groups may exist in a lift zone than shown in lift zone 1500. The arrangement of the groups may also vary between examples. While first group 1530 and second group 1540 of lift zone 1500 contain equal amounts of the transport devices 1510, other examples may have different amounts of transport devices 1510 in each of the groups. Further, in some examples the hoses, or other means, for providing liquid or gas to the transport devices 1510 may comprise quick connects to each of the transport devices 1510, such that a transport device 1510 may be easily switched between groups or zones by simply connecting the transport device 1510 to a different group or zone.

In other examples, the transport devices 1510 may comprise transport devices controlled individually, such as by electrical signal or an issued command. These transport devices may include mechanical transport devices or electrical transport devices. An ambulating transport system may comprise a processing device configured to transmit an electrical signal or issue a command to each of the transport devices, which in response may provide a desired lift force corresponding to the transport device.

Figure 16:
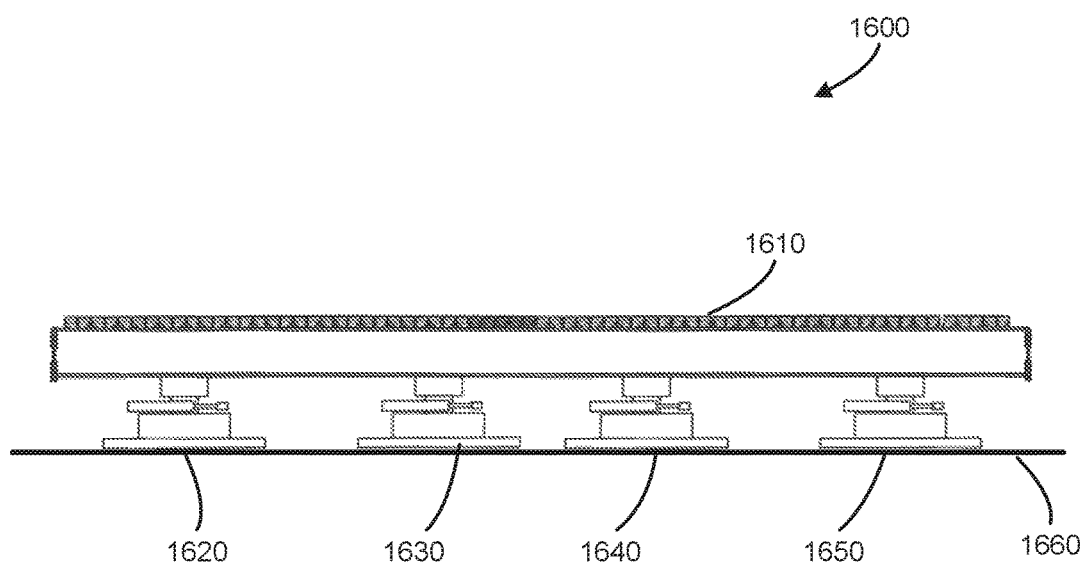
FIG. 16 illustrates a first step of an example walking cycle of an example ambulating transport system.

FIGS. 16-19 illustrate steps of an example walking cycle of an example ambulating transport system 1600. FIG. 16 illustrates a first step of an example walking cycle of an example ambulating transport system 1600. In the first step, all transport devices 1620, 1630, 1640, and 1650 may be fully retracted and the mounting structure 1610 may reside in a lowered position. While in this example the transport devices 1620, 1630, 1640, and 1650 are shown in contact with base surface 1660, it should be understood that in some examples a portion of the mounting structure 1610 may extend below the retracted transport devices 1620, 1630, 1640, and 1650, such that the portion of the mounting structure 1610 may contact the base surface 1660 while the transport devices 1620, 1630, 1640, and 1650 are raised off of the base surface 1660 when in a retracted position.

Figure 17:
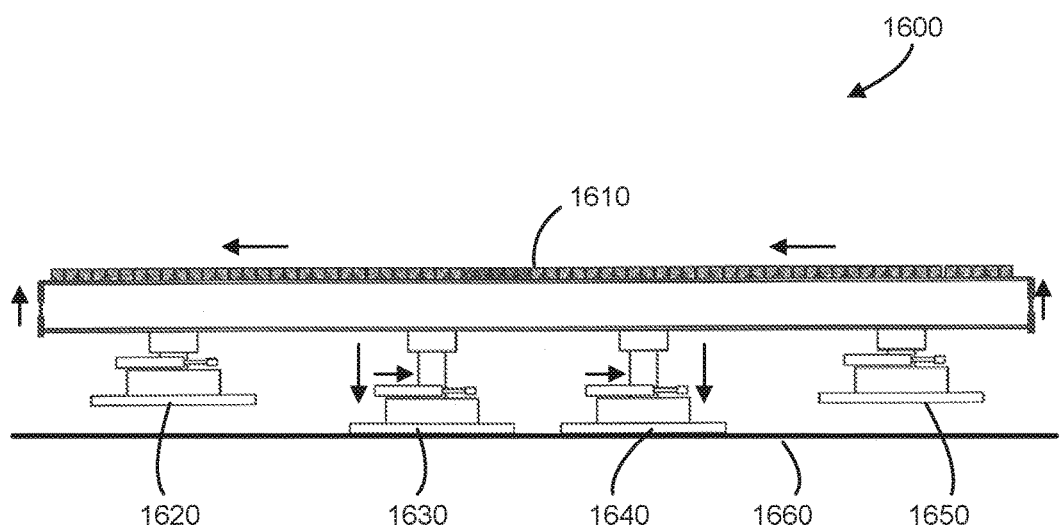
FIG. 17 illustrates a second step of the example walking cycle of FIG. 16.

FIG. 17 illustrates a second step of the example walking cycle of FIG. 16. In the second step, a first group of transport devices, such as transport device 1630 and transport device 1640, may be actuated. The extension of the first group of transport devices 1630 and 1640 results in the mounting structure 1610 being moved into an elevated position and a second group of transport devices, such as transport devices 1620 and 1650, being raised off the base surface 1660. Once vertical actuation has been initiated or completed, the first group of transport devices 1630 and 1640 may be horizontally translated, displaced, or otherwise moved, thereby causing the elevated mounting structure 1610 to move along the base surface 1660 in a selected direction of travel.

The first group of transport devices 1630, 1640 may be configured to concurrently contact the base surface 1660 or ground during a movement step of the support structure 1610. Additionally, the first group of transport devices 1630, 1640 may be configured to support a weight of the load during the movement step.

The second group of transport devices 1620, 1650 may be configured to disengage from the base surface 1660 during the movement step of the support structure 1610. In some examples, the first group of transport devices 1630, 1640 may comprise translation mechanisms configured to laterally displace the support structure 1610 along the base surface 1610 after the second group of transport devices 1620, 1650 are disengaged from the base surface 1660.

Figure 18:
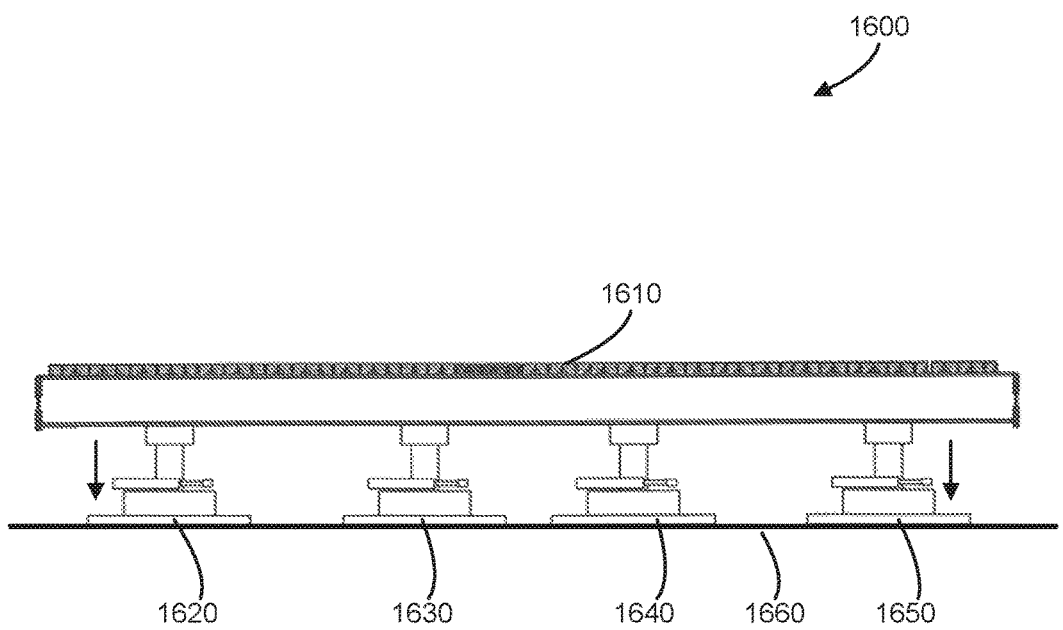
FIG. 18 illustrates a third step of the example walking cycle of FIG. 16.

FIG. 18 illustrates a third step of the example walking cycle of FIG. 16. In the third step, the second group of transport devices 1620 and 1650 may be actuated in the vertical direction. At this point, the first group of transport devices 1630 and 1640 and the second group of transport devices 1620 and 1650 may be in extended positions and may be in contact with the base surface 1660. The mounting structure 1610 remains in the elevated position during the third step.

Following the movement step illustrated in FIG. 17, the second group of transport devices 1620, 1650 may be configured to contact and/or be reengaged with the base surface 1660 during a second or subsequent movement step of the mounting structure 1610. In some examples, the weight of the mounting structure 1610 and/or load may be transferred from the first group of transport devices 1630, 1640 to the second group of transport devices during the second movement step.

Figure 19:
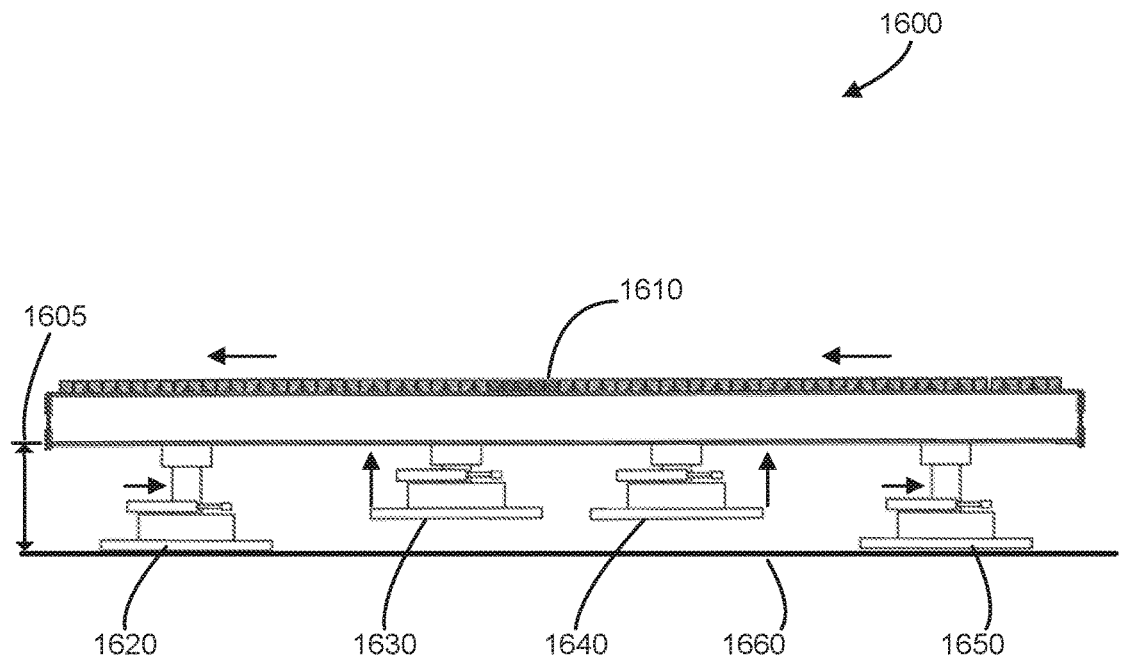
FIG. 19 illustrates a fourth step of the example walking cycle of FIG. 16.

FIG. 19 illustrates a fourth step of the example walking cycle of FIG. 16. In the fourth step, the first group of transport devices 1630 and 1640 may be fully retracted, thereby raising the first group of transport devices 1630 and 1640 off the base surface 1660. Once the first group of transport devices 1630 and 1640 are retracted, the second group of transport devices 1620 and 1650 may be horizontally translated, displaced, or otherwise moved, thereby causing the elevated mounting structure 1610 to move further along the base surface 1660 in the selected direction of travel.

The plurality of transport devices 1620-1650 may be configured to support the mounting structure 1610 at a predetermined height 1605 above the base surface 1660. During the second movement step, the first group of transport devices 1630, 1640 may be configured to be disengaged from the base surface 1660, and the mounting structure 1610 may be configured to remain substantially at the predetermined height 1605 during and/or throughout the steps illustrated at FIGS. 17-19.

In some examples, the plurality of transport devices 1610-1650 may additionally be configured to support the mounting structure 1610 at a predetermined angle of incline with respect to the base surface 1660, such as when one or both of the base structure and base surface are non-level. The mounting structure 1610 may be configured to remain substantially at the predetermined angle of incline during and/or throughout the steps illustrated at FIGS. 17-19.

The second group of transport devices 1620, 1650 may comprise additional translation mechanisms configured to laterally displace the mounting structure 1610 along the base surface 1660 after the first group of transport devices 1630, 1640 are disengaged from the base surface 1660.

The weight of the mounting structure 1610 and/or load may be repeatedly transferred between the first group of transport devices 1630, 1640 and the second group of transport devices 1620, 1650 as the mounting structure 1610 is alternated between a first movement step and a second movement step.

The first group of transport devices 1630, 1640 and/or the second group of transport devices 1620, 1650 may be configured to extend from a retracted position to the base surface 1660 during the movement steps. In some examples, the load transporting apparatus 1600 may comprise a hydraulic system, such as hydraulic system 3600 illustrated in FIG. 36, configured to apply hydraulic pressure to the plurality of transport devices to support the mounting structure 1610 above the base surface 1660.

In some examples, one or both of the first group of transport devices 1630, 1640 and the second group of transport devices 1620, 1650 may be configured to lift the mounting structure 1610 by a predetermined distance when the hydraulic pressure is applied.

The steps described in FIGS. 17-19 may be repeated for continued walking of the ambulating transport system 1600. In some examples, the walking cycle may be configured to alternate between actuations of the groups within a lift zone, where the mounting structure 1610 is maintained in the elevated position during motion from a starting location to an end location. Further, the vertical and horizontal actuations between groups may overlap in some examples.

In some examples, including when utilizing the transport devices described in FIGS. 3 and 4, the roller assembly 330 (FIG. 3) or 430 (FIG. 4), respectively, that provides horizontal movement may be located below the lift cylinder that provides vertical movement. Due to this configuration, the force acting upon each transport device from the load remains in a constant position relative to the lift mechanism 320 or 420, respectively. This configuration may reduce stress and torque acting upon the transport devices.

While the walking cycle of FIGS. 16-19 illustrates full extension or retraction of the transport devices in both the vertical and horizontal directions, it is to be understood that in some instances partial extension and retraction of the transport devices may be utilized. For example, a portion of the transport devices may be partially extended when on uneven ground while still providing the desired lift force.

Figure 20:
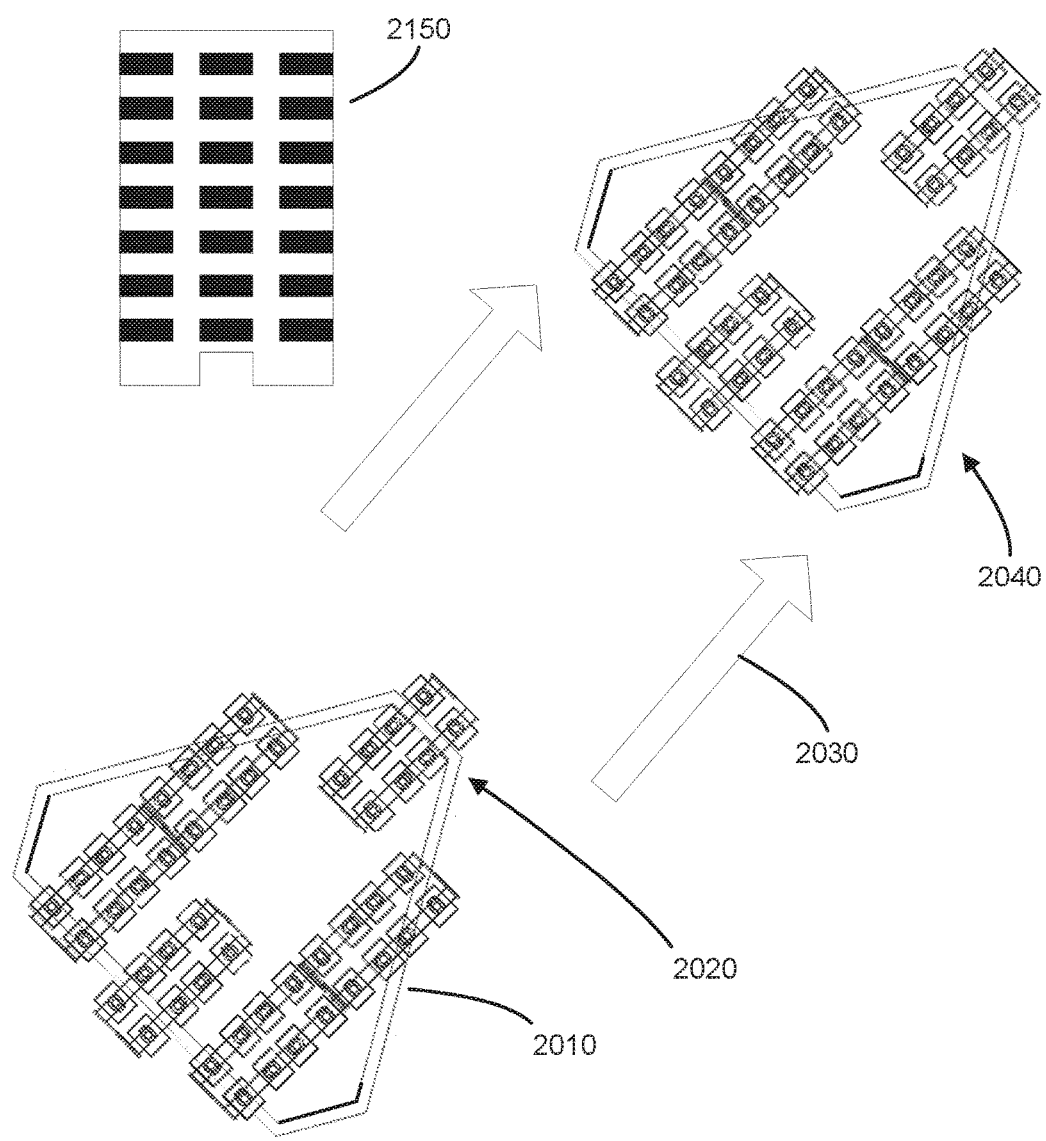
FIG. 20 illustrates an example ambulating transport system moving in a straight path of travel.

FIG. 20 illustrates an example ambulating transport system 2010 moving in a straight path 2030 of travel. The ambulating transport system 2010 may be configured to utilize the walking cycles as described in FIGS. 16-19. In this example, ambulating transport system 2010 is at a start location 2020 and moves along a base surface in a first direction of travel comprising a straight path 2030 past an object 2150. The ambulating transport system 2010 comes to rest at an end location 2040.

Figure 21:
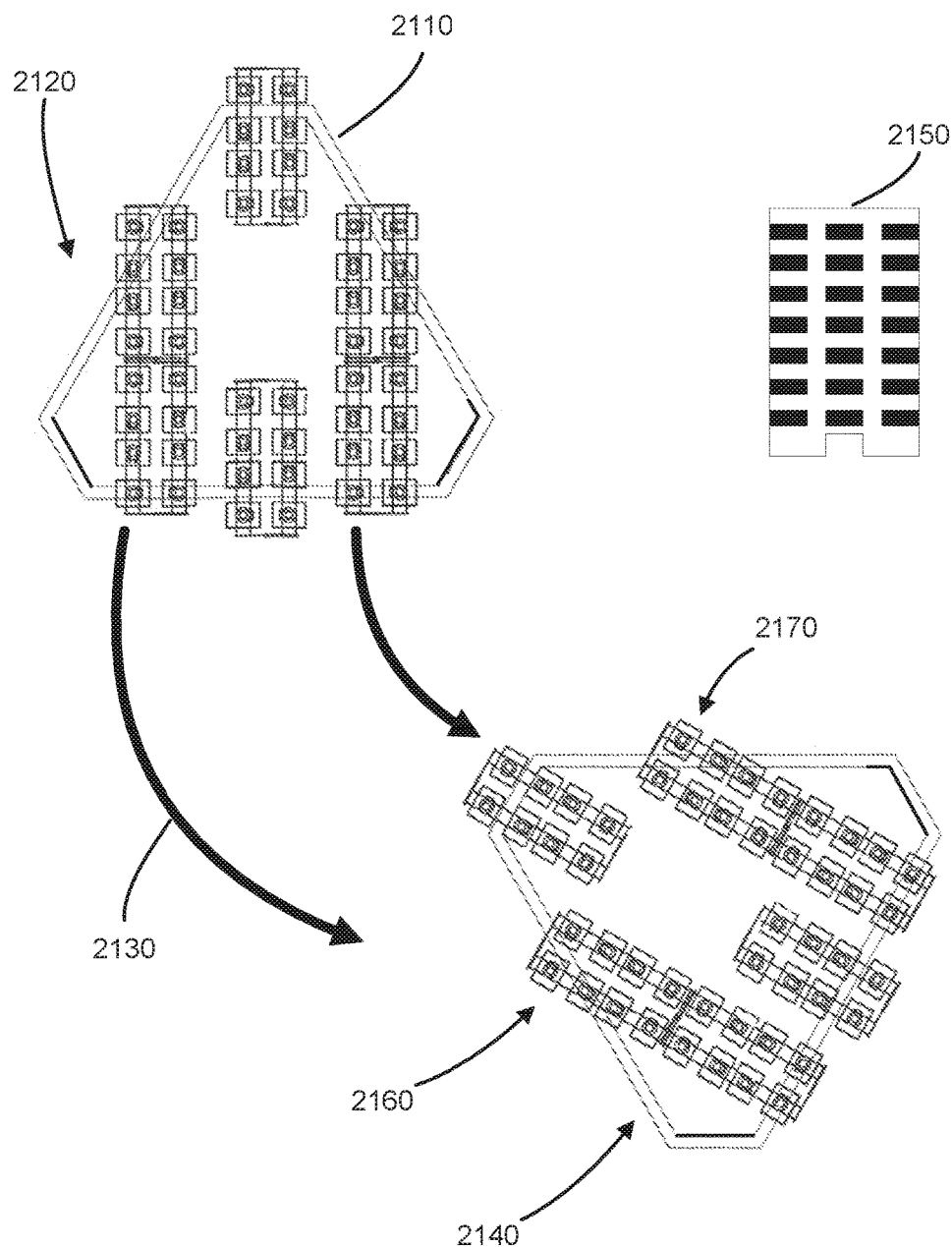
FIG. 21 illustrates an example ambulating transport system moving in a curved path of travel.

FIG. 21 illustrates an example ambulating transport system 2110 moving in a curved path 2130 of travel. In this example, the ambulating transport system 2110 moves in a direction of travel along a curved path 2130 from start location 2120 to end location 2140, such that the ambulating transport system 2110 may avoid obstacle 2150, such as a building, or otherwise be repositioned. In some examples, the rotational motion of ambulating transport system 2110 may be accomplished by varying the amount of horizontal translation of each transport device oriented in a single direction within the ambulating transport system 2110. For example, the transport devices on the outside of the curved path of motion 2160 may have a greater horizontal translation than the transport devices on the inside of the curve 2170.

Figure 22:
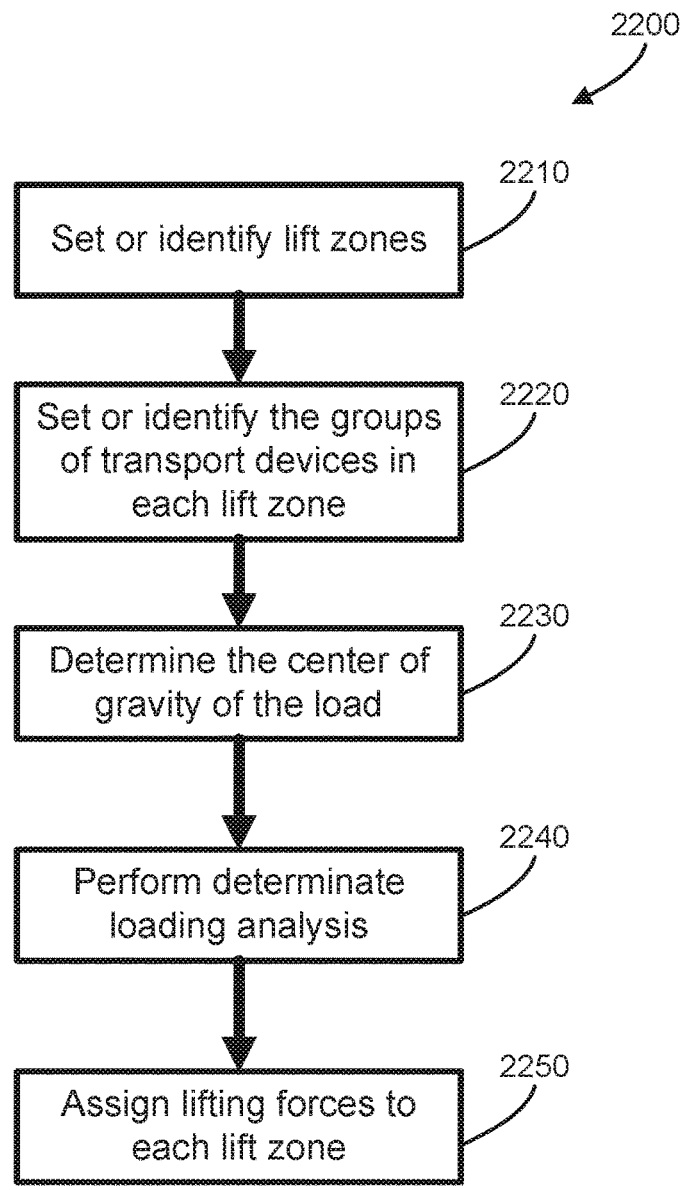
FIG. 22 illustrates an example process of assigning lifting forces to lift zones of an ambulating transport system.

FIG. 22 illustrates an example process 2200 of assigning lifting forces to lift zones of an ambulating transport system. In step 2210, segregated lift zones of the ambulating transport system may be either set or identified. Each lift zone comprises one or more transport devices. The lift zones may be set by connecting hoses to the transport devices comprising a lift zone.

In step 2220, groups of transport devices may be set or identified in each of the lift zones. Each lift zone may comprise one or more groups and each group may comprise one or more transport devices. In some examples, each group may comprise transport devices, such as transport device 300 (FIG. 3) or transport device 400 (FIG. 4), or lift devices, such as lift device 1100 (FIG. 11). The groups may be set by connecting hoses to all of the transport devices within a single group. In some examples, a pump may be configured to provide liquid or gas to all of the groups within a lift zone and may redistribute an amount of liquid or gas among the groups to provide actuation. In other examples, a pump may be assigned to each of the groups to provide actuation.

In step 2230, a center of gravity for a load residing on an ambulating transport system may be determined.

In step 2240, determinate loading analysis may be performed based on the center of gravity of the load. Determinate loading analysis may be used to calculate lift forces for each lift zone based on the center of gravity of the load. Determinate loading analysis may be dependent on any or all of an amount of lift zones and locations of the lift zones. In some examples, the ambulating transport system may comprise three lift zones and the lift zone nearest the center of gravity may provide the greatest lift force. Determinate loading analysis may be utilized to minimize torque and stress that may be placed on the load or ambulating transport system by a movement process.

In some examples, the determinate loading analysis may result in assigning lift forces to each of the groups within the lift zones, such that during actuation each group provides the corresponding lift force determined by the determinate loading analysis. Each group in a lift zone may be configured to receive the same pressure of liquid or gas when actuated, thereby providing the same lift force as each other group in the lift zone. In other examples, only a portion of the groups within each lift zone may be configured to provide the corresponding lift force determined by the determinate loading analysis. In some examples, another portion of the groups may be configured to provide a lift force according to indeterminate loading.

In step 2250, each lift zone may be assigned a lifting force. The lifting force may be based on the determinate loading analysis of step 2240. The assigned lifting force may be provided by the groups of transport devices within a lifting zone when actuated.

Figure 23:
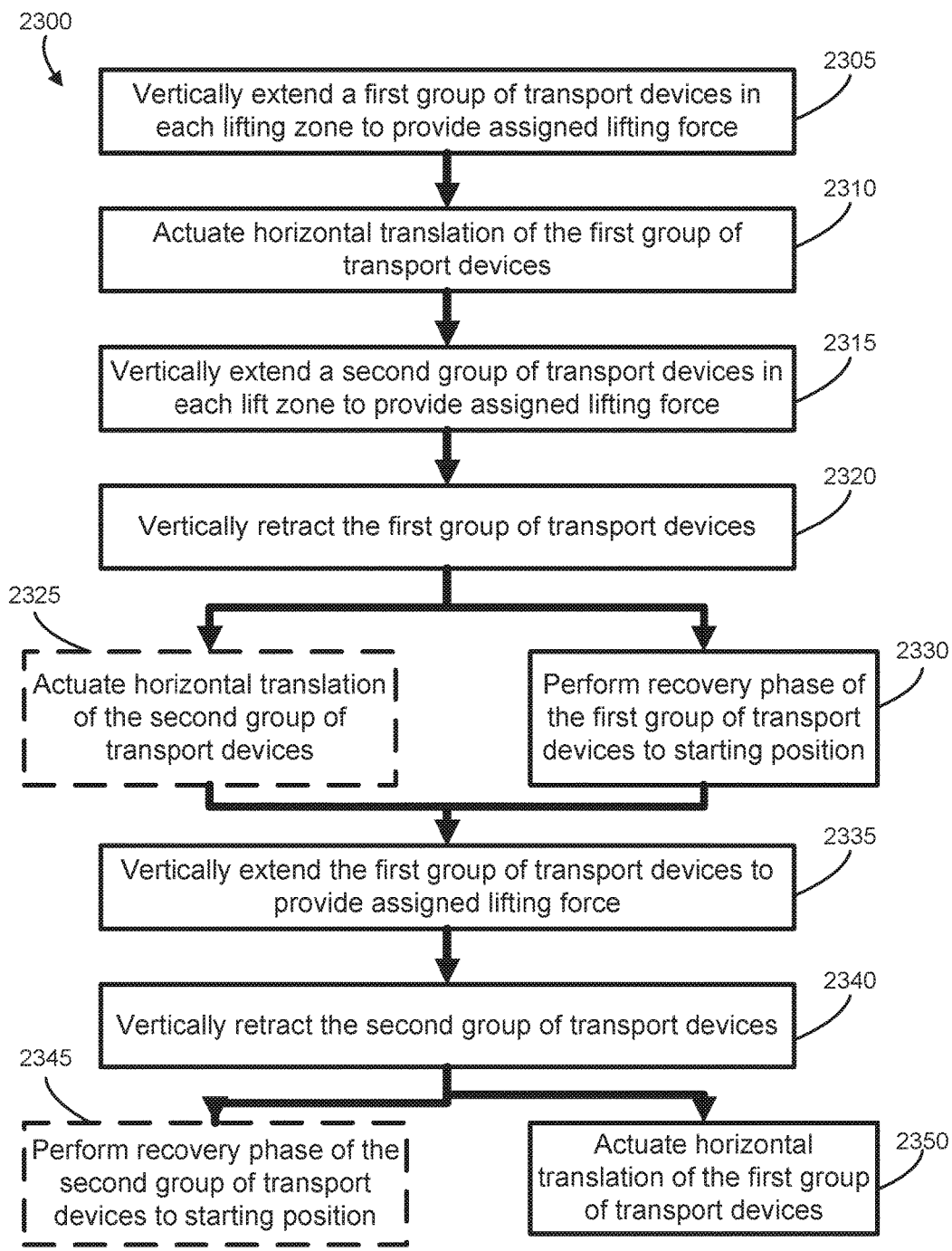
FIG. 23 illustrates an example process of a movement phase of an ambulating transport system.

FIG. 23 illustrates an example process 2300 of a movement phase of an ambulating transport system. In step 2305, a first group of transport devices within each lift zone may be extended such that the first group provides a lifting force assigned to the corresponding lift zone. In response, a mounting structure of the ambulating transport system and other groups of transport devices within each lift zone may be transitioned into elevated positions that are not in contact with a base surface.

For example, a first group of transport devices may be placed in contact with a base surface during a first movement step of the load, and the first group of transport devices may be distributed between three or more lift zones of the load. The first group of transport devices may be configured to support a weight of the load during the first movement step. In some examples, a second group of transport devices may be disengaged from the base surface during the first movement step. The second group of transport devices may also be distributed between the three or more lift zones of the base structure.

In step 2310, the first group of transport devices translates the ambulating transport system and supported load in a horizontal direction across the base surface. For example, the base structure may be laterally displaced along the base surface during the first movement step and after the second group of transport devices are disengaged from the base surface.

In step 2315, a second group of transport devices may be extended such that the second group provides the lifting force assigned to the corresponding lift zone. The second group may, at this point, support the mounting structure and the load on the base surface, whereas in other examples the second group may not support the mounting structure and load on the base surface until the first group of transport devices begins retraction in step 2320. As with the first group, the second group of transport devices may extend at different vertical lengths to provide the lifting force assigned. The second group of transport devices may be extended from a retracted position to the base surface during a second movement step of the base structure. In some examples, the second group of transport devices may contact and/or be reengaged with the base surface during the second movement step.

In step 2320, the first group of transport devices may be retracted. At this point, the mounting structure and load may be supported on the base surface by the second group of transport devices and the first group of transport devices resides in elevated positions that are not in contact with the base surface.

In some examples, the first group of transport devices may be disengaged from the base surface during the second movement step, and the weight of the load supported by the first group of transport devices may be transferred from the first group of transport devices to the second group of transport devices during the second movement step.

Additionally, hydraulic pressure may be transferred from the first group of transport devices to the extended second group of transport devices. The hydraulic pressure may be applied to the extended second group of transport devices to support the base structure above the base surface after the first group of transport devices are disengaged from the base surface.

In step 2325, the second group of transport devices translates the ambulating transport system and the supported load in a horizontal direction across the base surface. In step 2330, recovery of the first group of transport device occurs resulting in return of the first group to a starting position. The recovery phase prepares the first group of transport devices for another round of translation in the horizontal direction. In some examples, steps 2325 and 2330 may occur concurrently, while in other examples one of the steps may occur before the other. In some examples, step 2325 may not occur, such as when the second group of transport devices comprise lift devices, such as lift devices 1100 (FIG. 11), or are configured not to provide translation.

In step 2335, the first group of transport devices may be extended to provide the lifting force assigned. At this point, the first group of transport devices may support the mounting structure of the ambulating transport device and the load on the base surface, whereas in other examples the first group of transport devices may not support the mounting structure and the load until the second group of transport devices is retracted in step 2340.

In step 2340, the second group of transport devices may be retracted. At this point, the mounting structure and the load may be fully supported by the first group of transport devices, and the second group of transport devices and the mounting structure reside in elevated positions.

In step 2345, recovery of the second group of transport devices may occur. This step may occur similarly to step 2330 for the first group of transport devices. In step 2350, translation in the horizontal direction by the first group of transport devices may occur. The translation may occur similarly to step 2310. Steps 2345 and 2350 may occur concurrently, while in other examples one may occur before the other. In some examples, step 2345 may not occur such as when the second group of transport devices comprise lift devices, such as lift device 1100 (FIG. 11), or the second group is configured not to provide translation.

Process 2300 may continue by repeating steps 2315-2350. When the movement phase completes, both the first and second groups of transport devices may be fully retracted when the ambulating transport device reaches a desired end point. In other examples, a portion or all of the transport devices may be configured to remain in an extended position and continue to support the mounting structure of the ambulating transport device and the load when located at the desired end point.

An ambulating transport system may comprise of one or more groups per lift zone and the process 2300 may be altered accordingly. For example, support and movement of the mounting structure and load may transition through three groups of transport devices with a similar process to process 2300, alternating actuation among the three groups. Further, it should be understood that in some examples two or more of the steps in process 2300 may overlap in time.

Figure 24:
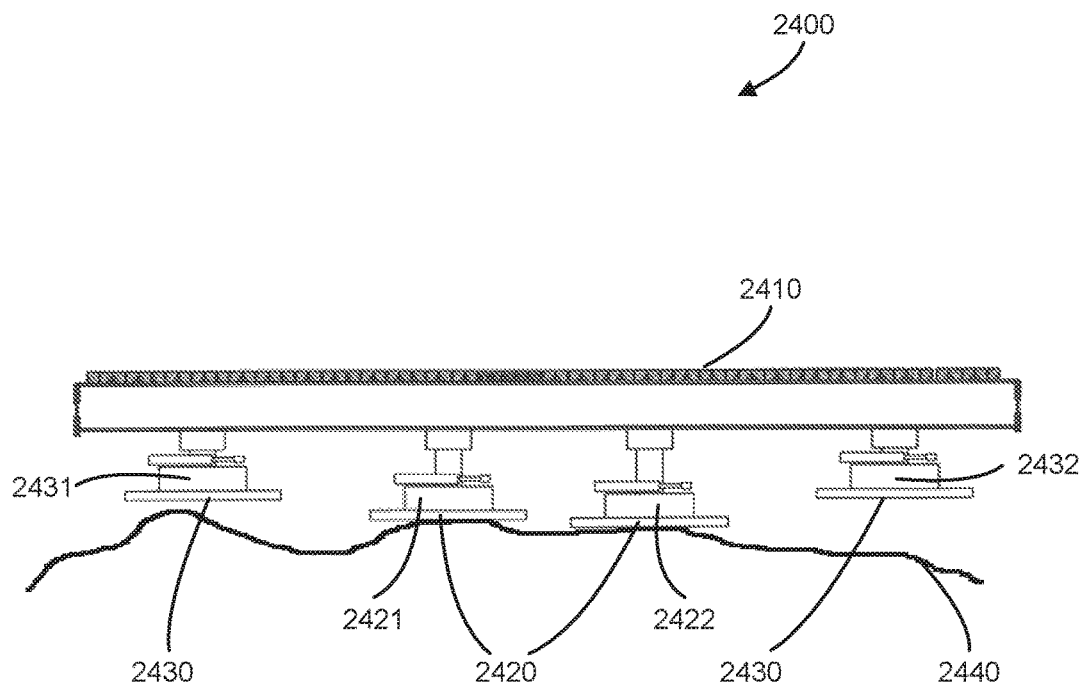
FIG. 24 illustrates an example ambulating transport system with transport devices configured to extend varied amounts.

FIG. 24 illustrates an example ambulating transport system 2400 with transport devices configured to extend varied amounts. Ambulating transport system 2400 may comprise a mounting structure 2410 that is supported on a first group of transport devices 2420 comprising a first transport device 2421 and a second transport device 2422. Additionally, ambulating transport system 2400 may comprise a second group of transport devices 2430, comprising a third transport device 2431 and a fourth transport device 2432, illustrated in a retracted, elevated position. The first group of transport devices 2420 may be extended and in contact with an uneven or non-flat base surface 2440.

One or more of the transport devices within the first group of transport devices 2420 may be extended at different vertical lengths to contact the non-flat base surface 2440, while still providing a corresponding lift force assigned to the respective transport device. For example, second transport device 2422 may be extended further from mounting structure 2410 than first transport device 2421. To provide translation of the ambulating transport system 2400 across the uneven base surface 2440, the second group of transport devices 2430 may be extended towards the uneven surface 2440, and the first group of transport devices 2420 may be retracted. The ambulating transport system 2400 may utilize a walking cycle similar to any, or a combination, of the walking cycles described in the disclosure.

The extension of the first group of transport devices 2420 may result in the transport devices extending to different vertical lengths to provide the corresponding assigned lift force due to such variables as the non-flat base surface 2440. The differing extensions may reduce or prevent torque and stress that may act upon the load or ambulating transport system during the movement process.

In some examples, one or more extended devices of the first group of transport devices 2420 may be extended by different amounts to contact the uneven surface 2440. Additionally, transport system 2400 may comprise a hydraulic system, such as hydraulic system 3600 illustrated in FIG. 36, configured to distribute the hydraulic pressure between the one or more extended devices in order to support the mounting structure 2410 at a predetermined angle of incline with respect to the uneven base surface 2440.

Figure 25:
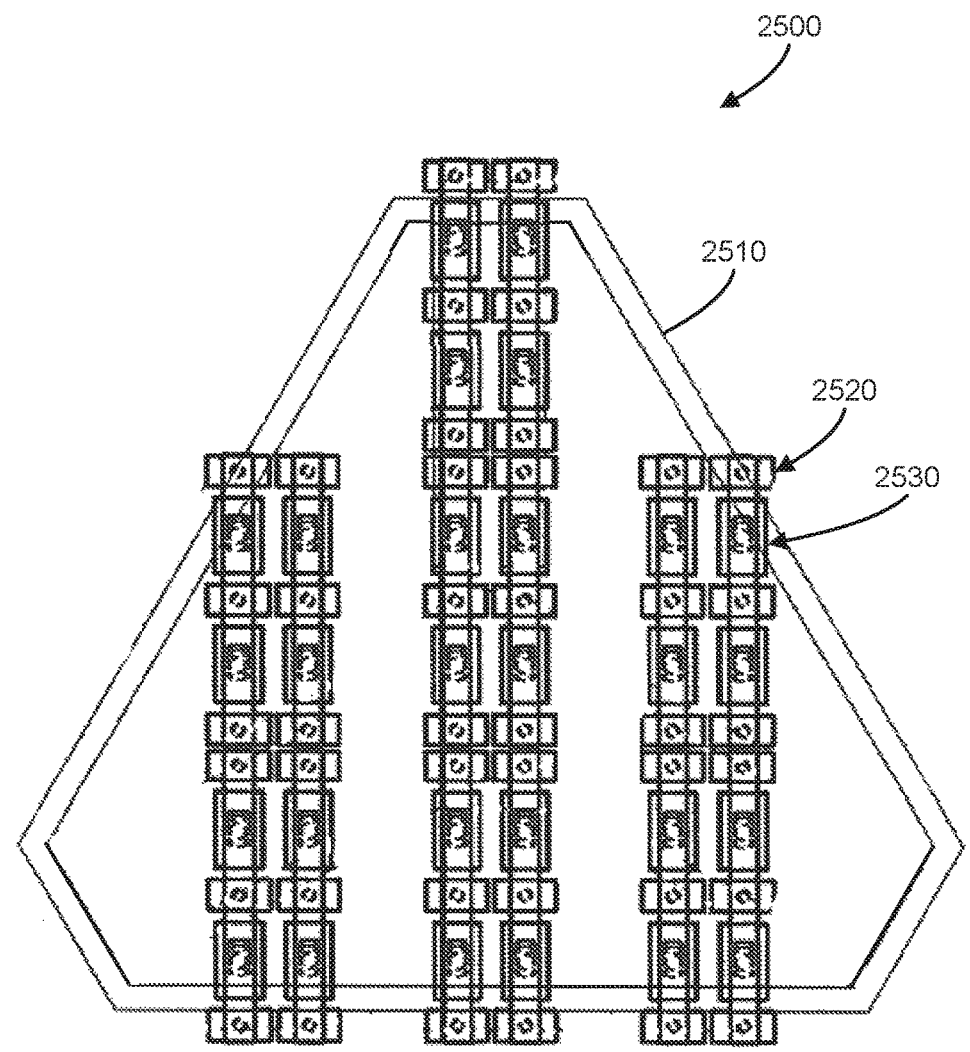
FIG. 25 illustrates a cross-sectional view of an example of an ambulating transport system comprising transport devices configured to move in different directions.

FIG. 25 illustrates a cross-sectional view of an example of an ambulating transport system 2500 comprising transport devices configured to move in different directions. Ambulating transport system 2500 may comprise a mounting structure 2510, which may be similar to mounting structure 240 (FIG. 2). A first portion of the transport devices 2520 may be configured to translate the ambulating transport system 2500 in a first direction. A second portion of the transport devices 2530 may be configured to translate the ambulating transport system 2500 in a second direction, different from the first direction. In some examples, the first portion of the transport devices 2520 may be attached to mounting structure 2510 at approximately right angles to the second portion of the transport devices 2530.

It should be understood that other examples may comprise transport devices having portions of the transport devices oriented for translation in a plurality of different directions. While one arrangement of the transport devices is shown, arrangement of the transport devices may differ in other examples.

In some examples, transport devices oriented in a plurality of directions may be actuated at the same time. For example, the transport devices may be oriented in a circular arrangement around a central point of an ambulating transport system, such that when a portion of the transport devices oriented in the plurality of different directions provide translation the mounting structure may rotate about the central point.

Further in some examples, a portion of the transport devices may comprise lift devices, such as lift device 1100 (FIG. 11). In some examples, the lift devices may be used as leveling devices providing a leveling function between walking cycles of the transport devices. In other examples, the lifting devices may be utilized to support the ambulating transportation system while the transport devices complete their recovery phase.

In some examples, the ratio of transport devices to lift devices may not be one-to-one. Further in some examples, each lift device may be capable of supporting less weight than the transport devices. For instance, the transport devices may need to be rated for 60,000 tons, while the lift devices may be rated for 40,000 tons for supporting the same load.

Figure 26:
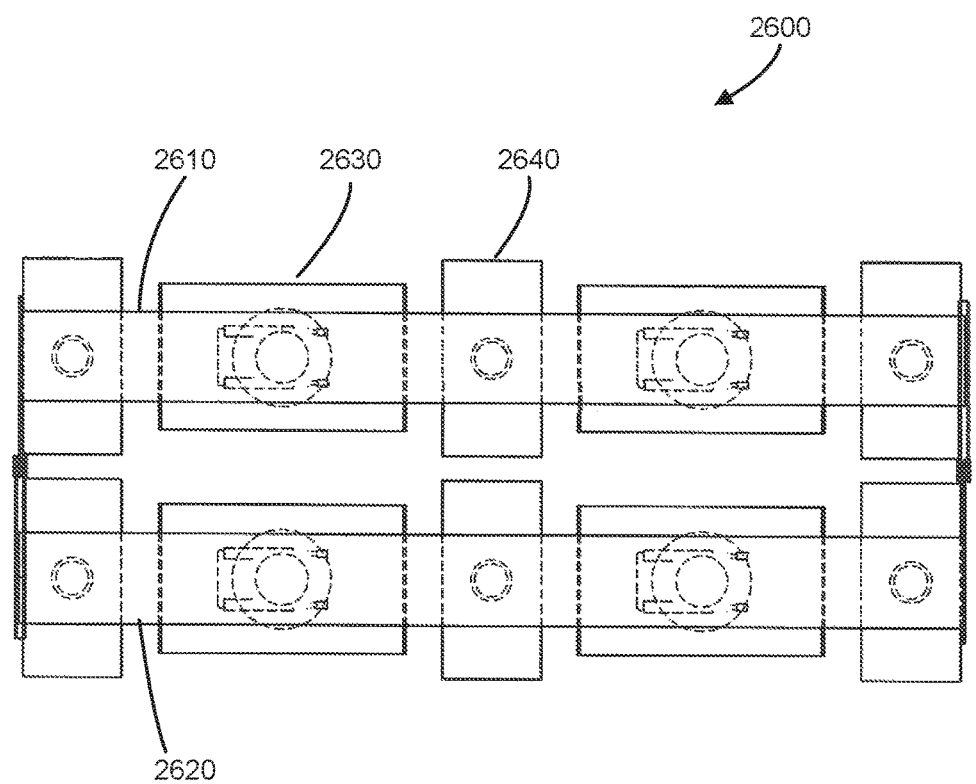
FIG. 26 illustrates a cross-sectional view of a support beam structure for an ambulating transport system with transport devices configured to move in different directions.

FIG. 26 illustrates a cross-sectional view of a support beam structure 2600 for an ambulating transport system with transport devices configured to move in different directions. The transport devices may be arranged along a first support beam 2610 and a second support beam 2620. The transport devices may be arranged in alternating positions along each support beam, alternating between transport devices oriented in a first direction 2630 and transport devices oriented in a second direction 2640.

The transport devices oriented in the first direction 2630 may be aligned along an approximate longitudinal centerline of the support beams 2610, 2620. Additionally, the transport devices oriented in the second direction 2640 may be aligned approximately perpendicular to the longitudinal centerline of the support beams 2610, 2620. The transport devices oriented in the first direction 2630 may be configured to translate, displace or otherwise move in the first direction. Similarly, the transport devices oriented in the second direction 2640 may be configured to translate, displace or otherwise move in the second direction.

In other examples, the transport devices may be arranged differently, such that a first portion of adjacent transport devices may be oriented in a same direction, while a second portion of adjacent transport devices are oriented in different directions. Further in some examples, the transport devices may be oriented in more or less directions than the two directions illustrated.

Figure 27:
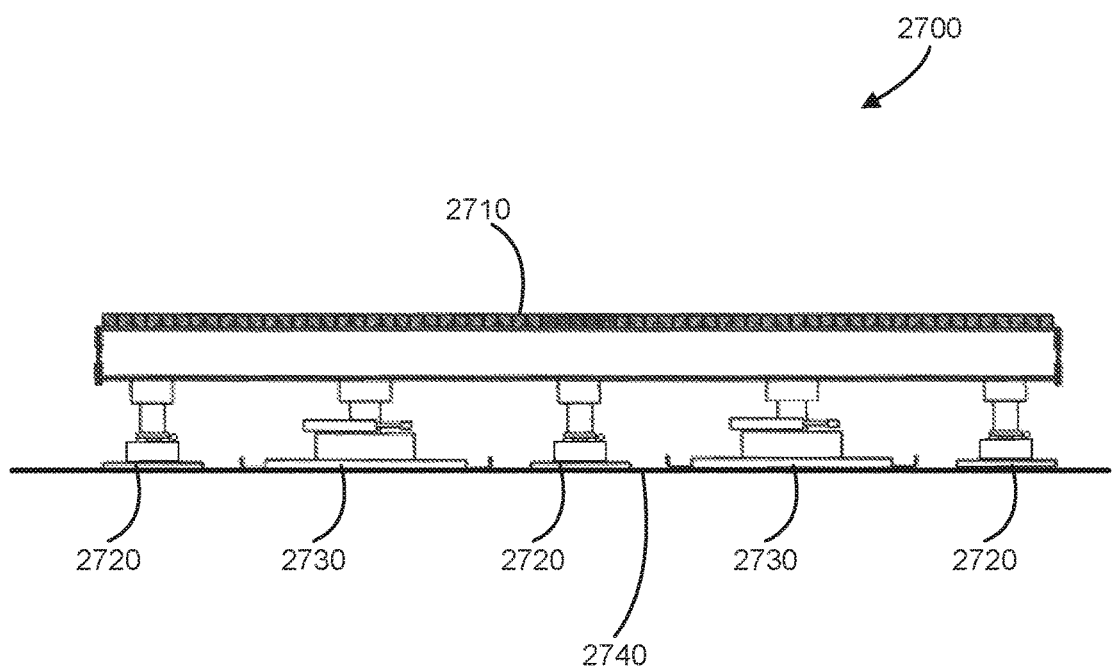
FIG. 27 illustrates a first step of an example walking cycle for an ambulating transport device with transporting devices configured to move in different directions.

FIGS. 27-30 illustrate an example ambulating transport system 2700 configured to move a mounting structure 2710 along base surface 2740. FIG. 27 illustrates a first step of an example walking cycle for the ambulating transport system 2700 with transporting devices configured to move in different directions. FIG. 27 illustrates a first set of transport devices 2720 configured to move the mounting structure 2710 in a first direction and a second set of transport devices 2730 configured to move the mounting structure in a second direction. One or both sets of transport devices 2720, 2730 may be attached to a bottom of the mounting structure 2710. The first set 2720 and the second set 2730 of the transport devices may be in a fully retracted position and may be in contact with the base surface 2740 when retracted. In some examples, a portion of the mounting structure 2710 may extend below the transport devices when retracted, such that the mounting structure 2710 may be in contact with the base surface 2740 when the transport devices are fully retracted and the transport devices may be located in an elevated position not contacting the base surface 2740.

In some examples, the second group of transport devices 2720 may comprise hydraulic cylinders operably coupled to support feet that engage the base surface 2740. The hydraulic cylinders may be configured to raise the support feet during an initial movement step in which the second group of transport devices 2720 are disengaged from the base surface 2740.

Figure 28:
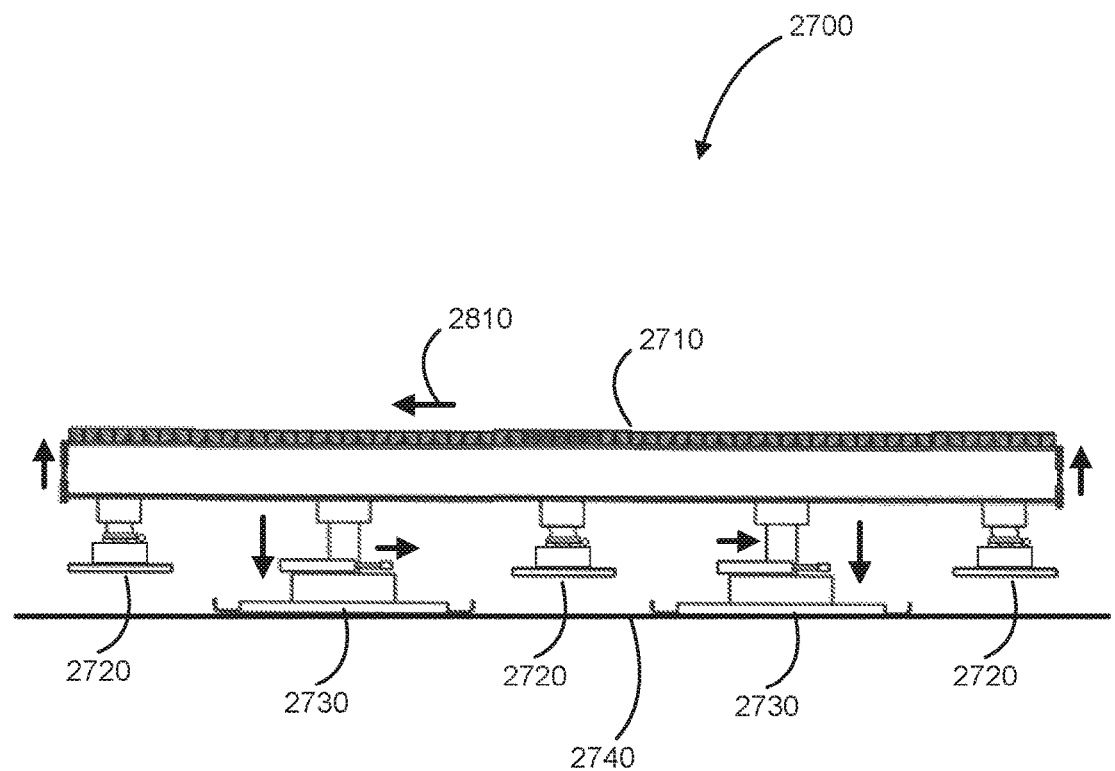
FIG. 28 illustrates a second step of the example walking cycle of FIG. 27.

FIG. 28 illustrates a second step of the example walking cycle of FIG. 27. The second set of the transport devices 2730 may be extended in the vertical direction, thereby raising the mounting structure 2710 and the first set of the transport devices 2720 off the base surface 2740 into elevated positions. At this point, the mounting structure 2710 may be supported on the base surface 2740 by the second set 2730 of the transport devices. The second set 2730 may then translate, displace, or otherwise move the mounting structure 2710 and the first set 2720 in a first horizontal direction 2810 relative to the base surface.

Figure 29:
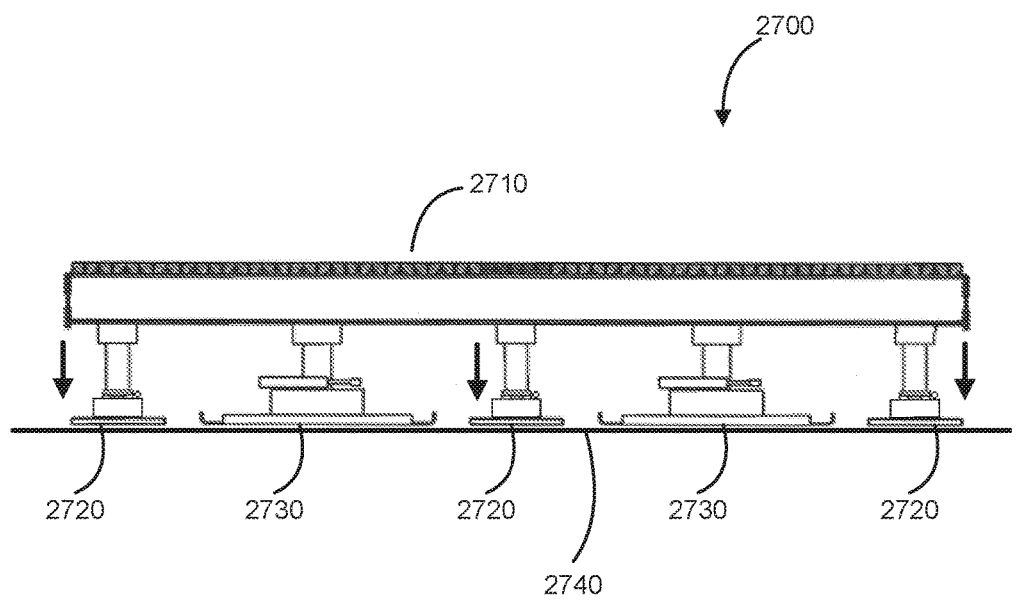
FIG. 29 illustrates a third step of the example walking cycle of FIG. 27.

FIG. 29 illustrates a third step of the example walking cycle of FIG. 27. The first set of the transport devices 2720 may be extended in the vertical direction, thereby placing both the first set 2720 and the second set of the transport devices 2730 in contact with the base surface 2740. The mounting structure 2710 may remain elevated during this process.

Figure 30:
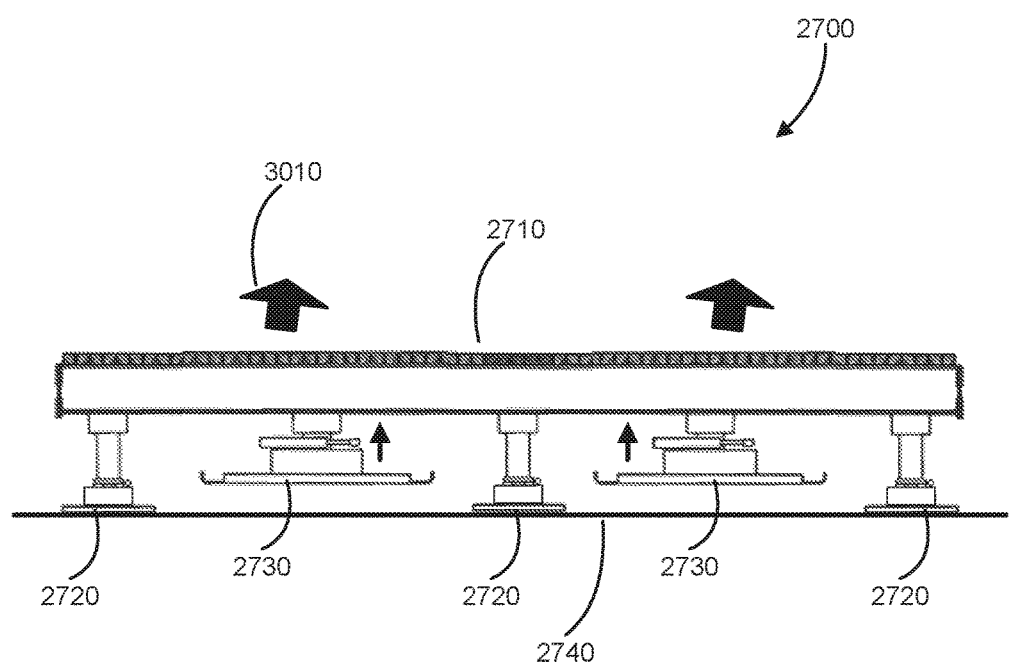
FIG. 30 illustrates a fourth step of the example walking cycle of FIG. 27.

FIG. 30 illustrates a fourth step of the example walking cycle of FIG. 27. The second set of the transport devices 2730 may be retracted in the vertical direction, thereby causing the first set of the transport devices 2720 to support the mounting structure 2710 and the second set of the transport devices 2730 to transition into an elevated position. The first set 2720 may then translate, displace, or otherwise move the mounting structure 2710 and the second set 2720 in a second horizontal direction 3010 along the base surface 2740, different from the first horizontal direction 2810 (FIG. 28). The second set of the transport devices 2730 may perform a recovery phase when the second set 2730 is no longer in contact with the base surface 2740.

The example walking cycle of FIGS. 27-30 may continue by repeating the steps illustrated in FIG. 28-30 with one of the first set 2720 and the second set 2730 of the transporting devices supporting the mounting structure and providing horizontal translation, while the other set is retracted and performs a recovery phase.

Figure 31:
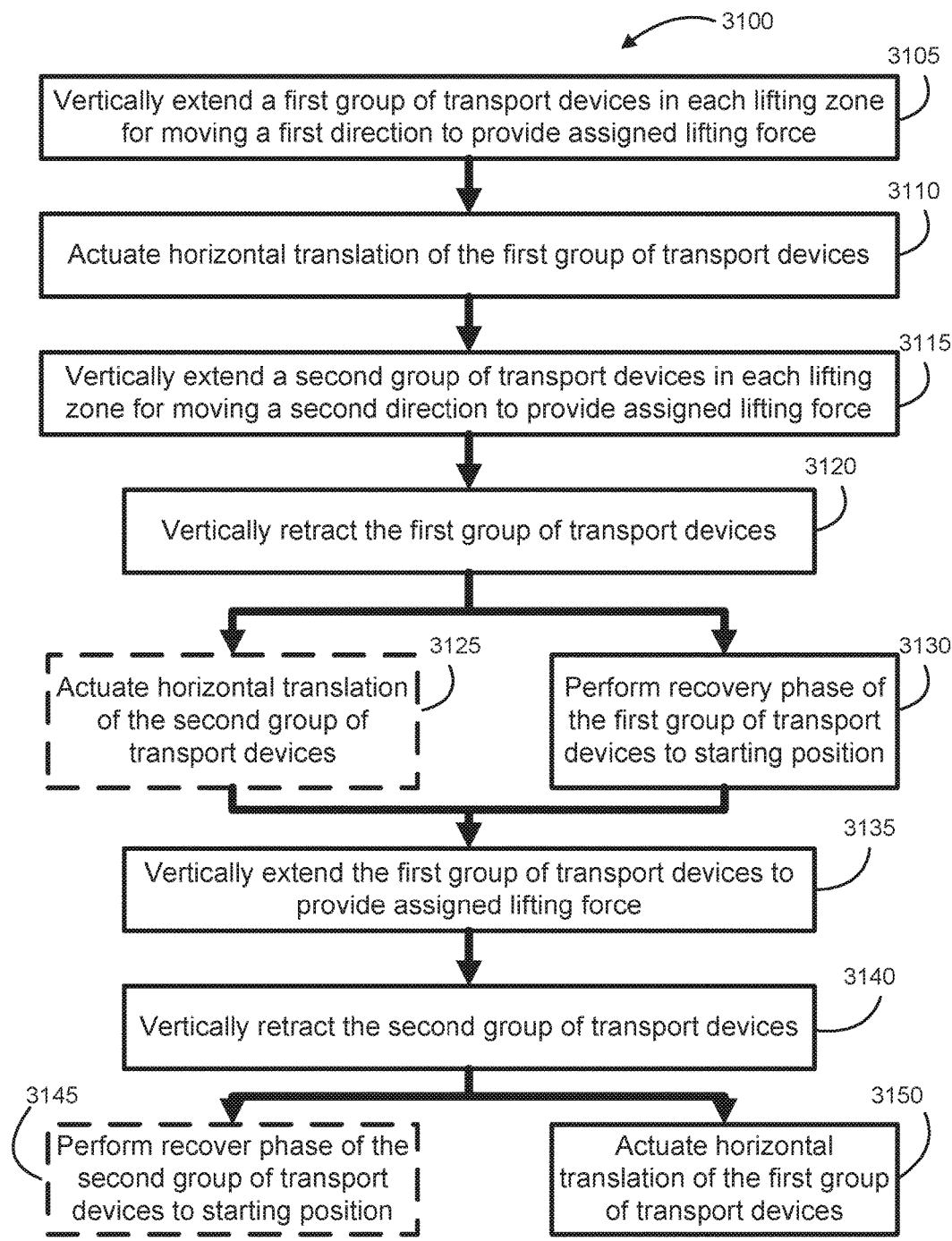
FIG. 31 illustrates an example process of a movement phase of an ambulating transport system with transport devices configured to move in different directions.

FIG. 31 illustrates an example process 3100 of a movement phase of an ambulating transport system with transport devices configured to move in different directions. Process 3100 may operate similarly to process 2300 (FIG. 23). Set up process 2200 (FIG. 22) may occur and be applied to process 3100 as part of a setup process prior to initiation of process 3100.

In step 3105, a first group of transport devices, oriented to provide movement in a first direction, within each lift zone may be extended in the vertical direction to provide lifting forces assigned to the corresponding lift zones. In response, a mounting structure and other transport devices may be raised into an elevated position while the first group supports the mounting structure on a base surface.

In step 3110, the first group of transport devices may translate, displace, or otherwise move the mounting structure and other transport devices in the first direction.

In step 3115, a second group of transport devices, oriented to provide movement in a second direction, within each lift zone may be extended in the vertical direction to provide the lifting forces assigned to the corresponding lift zones. At this point, the first group and second group may both be in contact with the base surface while the mounting structure remains in the elevated position.

In step 3120, the first group of transport devices may be retracted, thereby causing the second group of transport devices to support the mounting structure on the base surface. The mounting structure may remain in the elevated position and the first group of transport devices may transition into an elevated position that is not in contact with the base surface.

In step 3125, the second group of transport devices may translate, displace, or otherwise move the mounting structure and other transport devices in the second direction. In step 3130, the first group of transport devices may enter a recovery phase in preparation for further horizontal movement. Steps 3125 and 3130 may occur concurrently or either step may occur prior to the other.

In step 3135, the first group of transport devices may be extended to provide the assigned lifting forces to the corresponding lift zones. At this point, the first group and the second group of transport devices may both be in contact with the base surface. The mounting structure may remain in the elevated position.

In step 3140, the second group of transport devices may be retracted, thereby causing the first group of transport devices to support the mounting structure on the base surface. The mounting structure may remain in the elevated position and the second group of transport devices may transition into an elevated position.

In step 3145, the second group of transport devices may enter a recovery phase in preparation for further movement. In step 3150, the first group of transport devices may translate, displace, or otherwise move the mounting structure and other transport devices in the first direction. Steps 3145 and 3150 may occur concurrently or either step may occur prior to the other.

Process 3100 illustrates movement with two groups of transport devices, although it is to be understood that more or less groups may exist in each lift zone. When a plurality of groups exists, support and movement of the mounting structure may occur by alternating among the pluralities of groups with an operation similar to process 100. In some examples, one or more of the groups may comprise lift devices that may support the mounting structure to provide a leveling function or while other groups comprising transport devices may enter a recovery phase.

Process 3100 and FIGS. 27-30 illustrate alternating among groups of different directions of horizontal translation for movement. In some examples, a flow of horizontal translation among the groups may vary to achieve a desired direction or path of movement, such that multiple translation actuations of a single group of transport devices may occur in succession to achieve the desired direction or path of movement.

Figure 32:
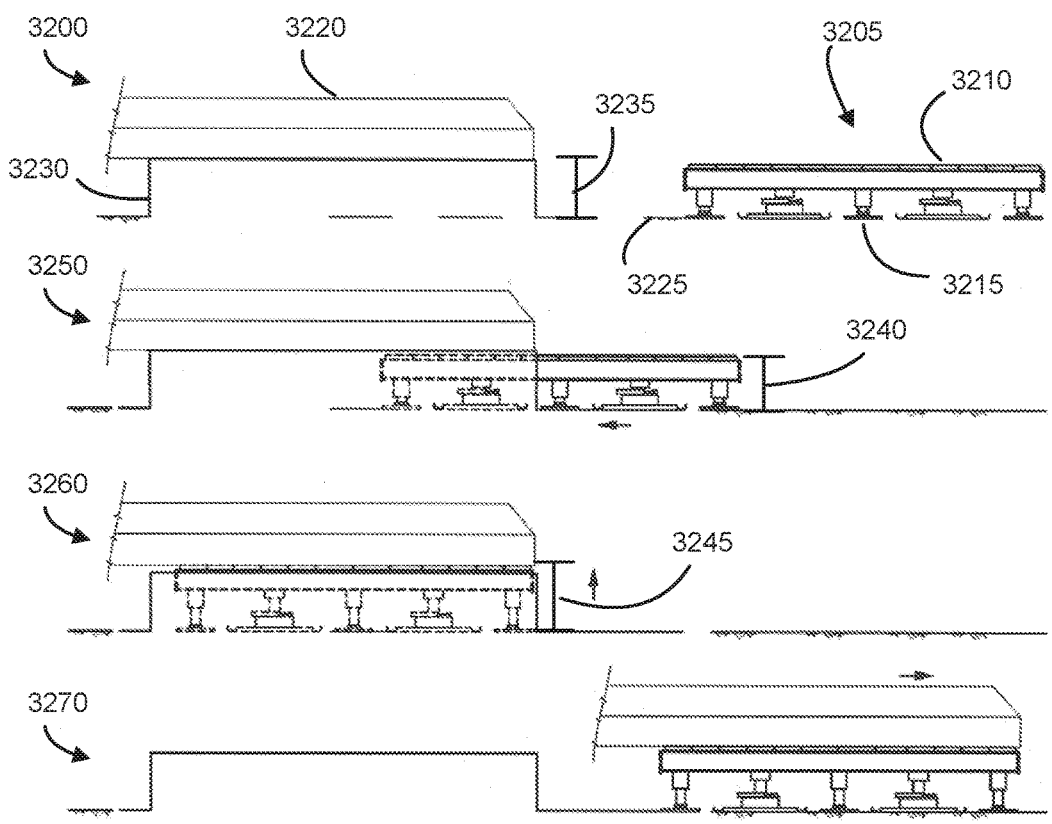
FIG. 32 illustrates an example non-attached ambulating transport system moving a load.

FIG. 32 illustrates an example non-attached ambulating transport system 3205 moving a load 3220. In step 3200, the load 220 may be supported by a support structure 3230 on a base surface 3225 at a support height 3235. The ambulating transport system 3205 may comprise a mounting structure 3210 with transport devices 3215 connected to the bottom of the mounting structure 3210 and configured to support the mounting structure 3210 on the base surface 3225.

In step 3250, ambulating transport system 3205 may move under the load 3220 by utilizing any, or a combination, of the walking cycles previously described. During movement in step 3250, the ambulating transport system 3205 may be maintained at or below a maximum height 3240, less than the support height 3235 of the support structure 3230 on which the load 3220 is supported.

In step 3260, the transport devices may be extended such that the mounting structure 3205 is maintained at or above a minimum height 3245, which is greater than the support height 3235 of the support structure 3230 on which the load 3220 was supported. At this point, the load 3220 may be lifted off of the support structure 3230, such that the ambulating transport system 3205 is supporting the full weight of the load 3220.

In step 3270, the ambulating support system 3205 may move the load 3220 away from the supporting structure 3230 through use of any, or a combination, of the walking cycles previously described. During movement of the mounting structure 3210 in step 3270, the mounting structure 3210 may be maintained at or above the support height 3235 at least until no portion of the load 3220 resides over the support structure 3230.

Figure 33:
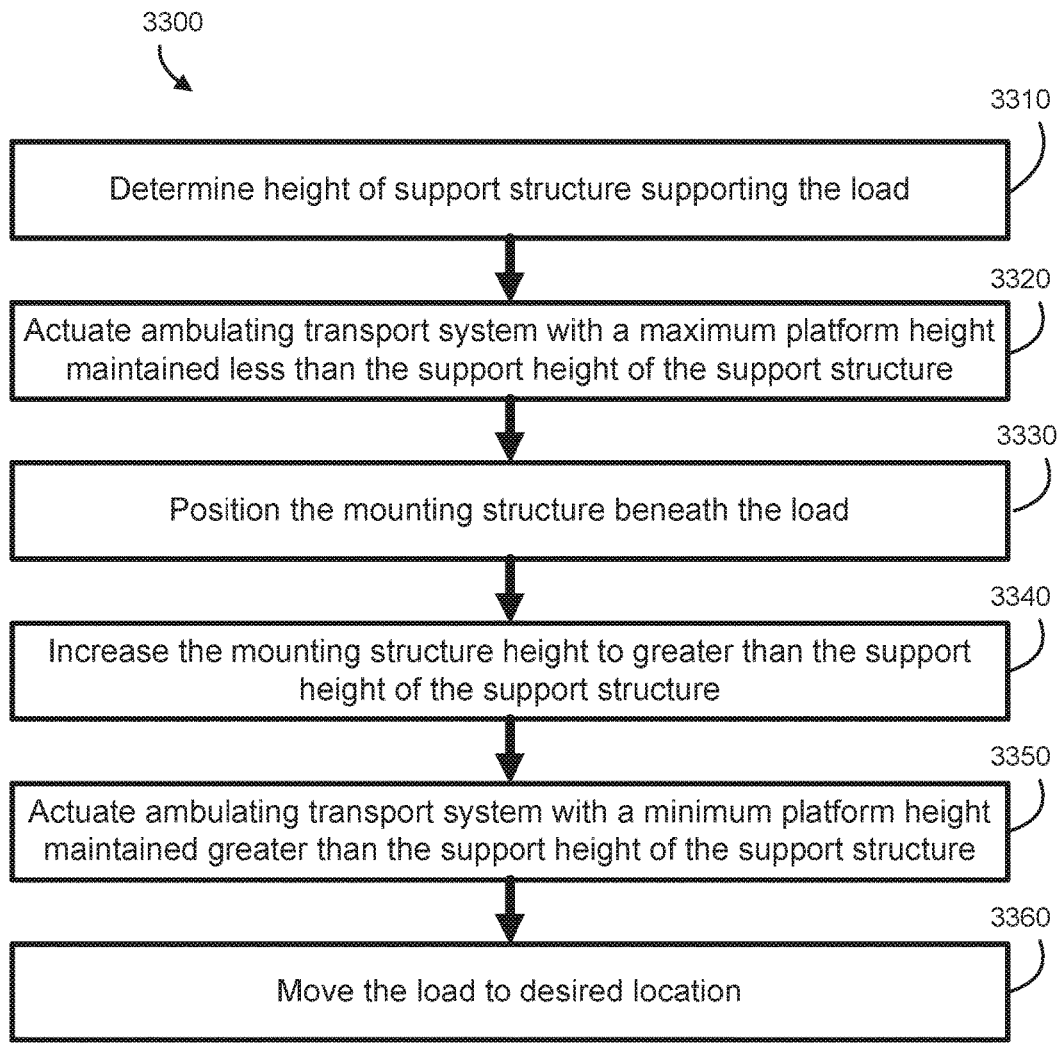
FIG. 33 illustrates an example process of operating a non-attached ambulating transport system.

FIG. 33 illustrates an example process 3300 of operating a non-attached ambulating transport system. In step 3310, a height of a support structure which supports a load may be determined.

In step 3320, a first movement cycle of the mounting structure may be initiated where the mounting structure maintains a maximum height less than the support height of the support structure. The first movement cycle may comprise any, or a combination, of the walking cycles previously described.

In step 3330, the first movement cycle may complete with the mounting structure located beneath the load that is supported on the support structure. The mounting structure may be positioned such that it lifts the load while minimizing any torque or stress that may be placed on the load by the process 3300.

In step 3340, the height of the mounting structure may be increased to a minimum height greater than the support height of the support structure. At this point, the entire load may be supported by the ambulating transport system on a base surface.

In step 3350, a second movement cycle of the mounting structure may be initiated where the mounting structure may maintain the minimum height greater than the support height of the support structure for at least a portion of the second movement cycle. The second movement cycle may comprise the any, or a combination, of the walking cycles previously described. The second movement cycle may be configured to move the ambulating transport system, with the load supported on the ambulating transport system, away from the support structure. In some examples, the second movement cycle may be configured to rotate the ambulating transport system, with the load supported on the ambulating transport system above the support structure.

In step 3360, the ambulating transport system and the load may be moved to a desired location. In an example where the desired location is a second support structure, the mounting structure of the ambulating transport system may be lowered such that the load is supported by the second support structure. In other examples, the load may continue to be supported on the ambulating transport system at the desired location, and the ambulating transport system may be set to maintain a certain extension amount of the transport devices. The extension amount may be at either of, or between, full extension and full retraction of the transport devices. The transport devices may be configured to maintain different lengths of extension to support the load at a level height on an uneven base surface.

Figure 34:
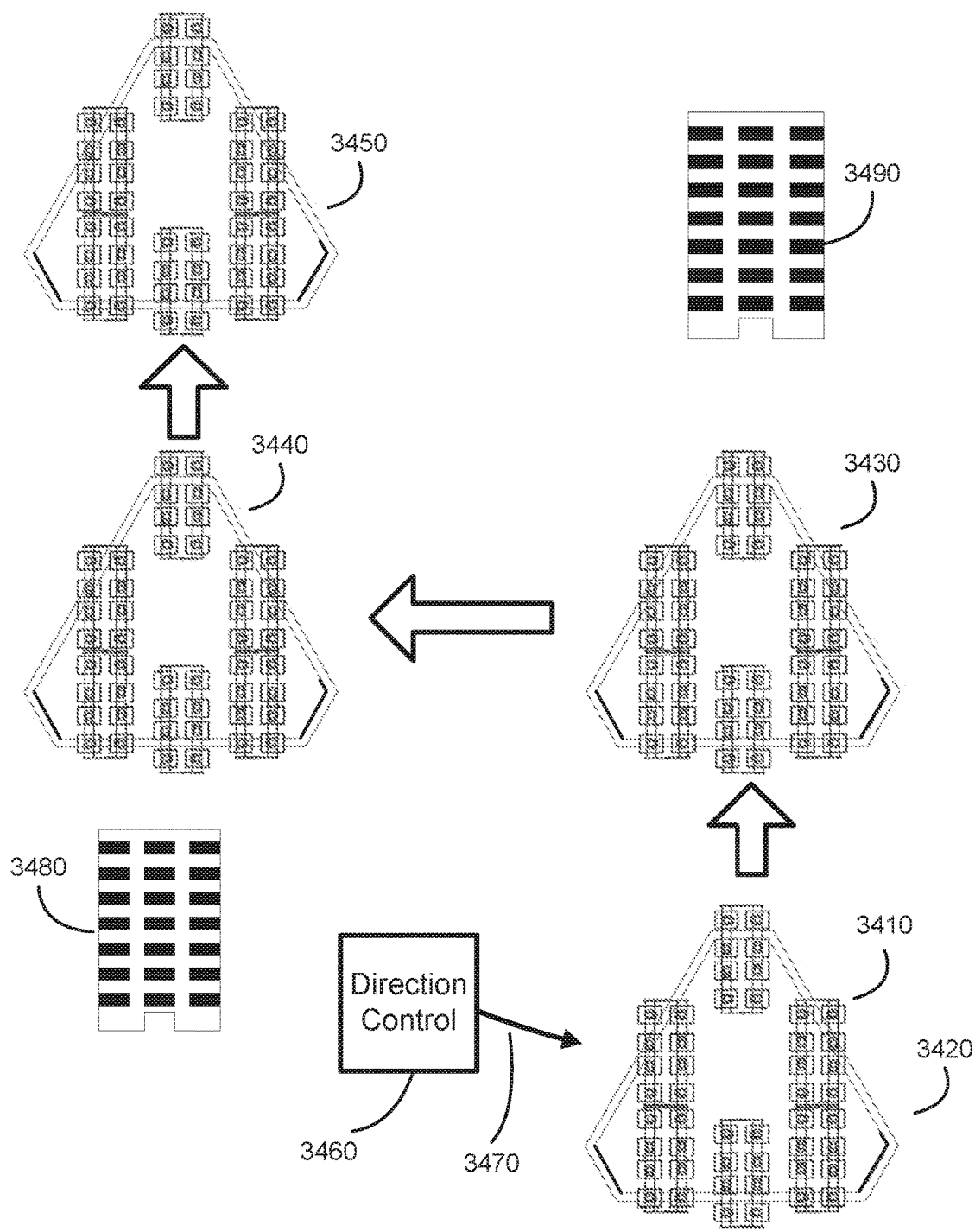
FIG. 34 illustrates example ambulating transport system with a direction control device.

FIG. 34 illustrates an example ambulating transport system 3410 with a direction control device 3460. The direction control device 3460 may comprise a stateless device, such as a joystick, that requests movement in the current direction indicated by the direction control device 3460. In other examples, the direction control device 3460 may comprise a stateful device, such as a computer, that may retain a course of travel for the ambulating transport system 3410 and request motion based on receiving and analyzing the current position of the ambulating transport system 3410. Communication between the direction control device 3460 and the ambulating transport system 3410 may occur over transmission line 3470. Transmission line 3470 may comprise a hard-wired communication line or wireless communication, including Wi-Fi, near field, internet protocol, radio, and Bluetooth communication mediums.

Ambulating transport system 3410 may receive requests from direction control device 3460 via transmission line 3470. In response to receiving requests from the direction control device 3410, ambulating transport system 3410 may initiate a movement cycle, by utilizing any, or a combination, of the walking cycles as previously described, in accordance with the requests received from the direction control device 3410. In this example, ambulating transport system 3410 begins at first location 3420 and receives a request to move in a first direction to second location 3430, thereby avoiding building 3480. Once at second location 3430, ambulating transport system 3410 receives a request to move in a second direction to third location 3440, thereby avoiding building 3490. Ambulating transport system 3410 then receives another request to move in the first direction from third location 3440 to fourth location 3450.

It is to be understood that ambulating transport system 3410 may be moved along curved lines and in diagonal directions. Further, direction control device 3460 may request rotation of the ambulating transport system 3410, which, in response to the request, the ambulating transport system 3410 may rotate around a center point of the ambulating transport system 3410.

Figure 35:
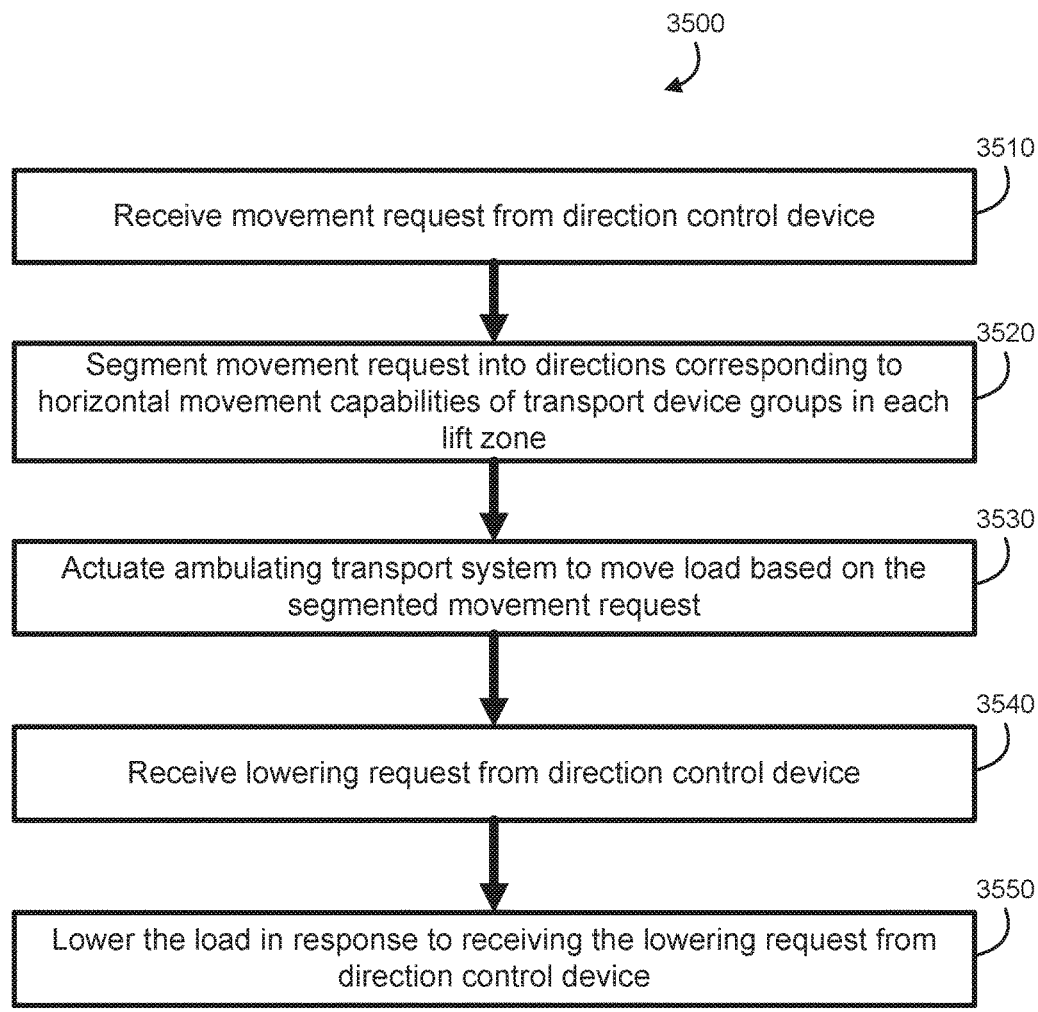
FIG. 35 illustrates an example process of controlling an ambulating transport system using a direction control device.

FIG. 35 illustrates an example process 3500 of controlling an ambulating transport system using a direction control device. In step 3510, a movement request may be received from the direction control device.

In step 3520, the movement request may be segmented into actuation and translation commands in discrete directions corresponding to horizontal movement capabilities of the ambulating transport system based on the orientation of the transport devices of the ambulating transport system. For instance, if a first group of transport devices is oriented to provide movement in a first horizontal direction and a second group of transport devices is oriented to provide movement in a second horizontal direction, and a request is received for movement in a direction between the first horizontal direction and the second horizontal direction, the request may be segmented into a series of translations by both the first and second groups of transport devices to replicate the direction of the request.

In step 3530, the ambulating transport system may be actuated to provide the requested movement. The actuation may comprise use of all the groups of transport devices or only a portion of the groups of transport devices to achieve the requested movement. The ambulating transport system may operate in compliance with the segmented movement request resulting from step 3520.

In step 3540, a lowering request may be received from the direction control device. A mounting structure of the ambulating transport system may have remained in an elevated position during the movement cycle and the lowering request may be issued to lower the mounting structure from the elevated position. In step 3550, the mounting structure with the load may be lowered in response to the request of step 3540.

Figure 36:
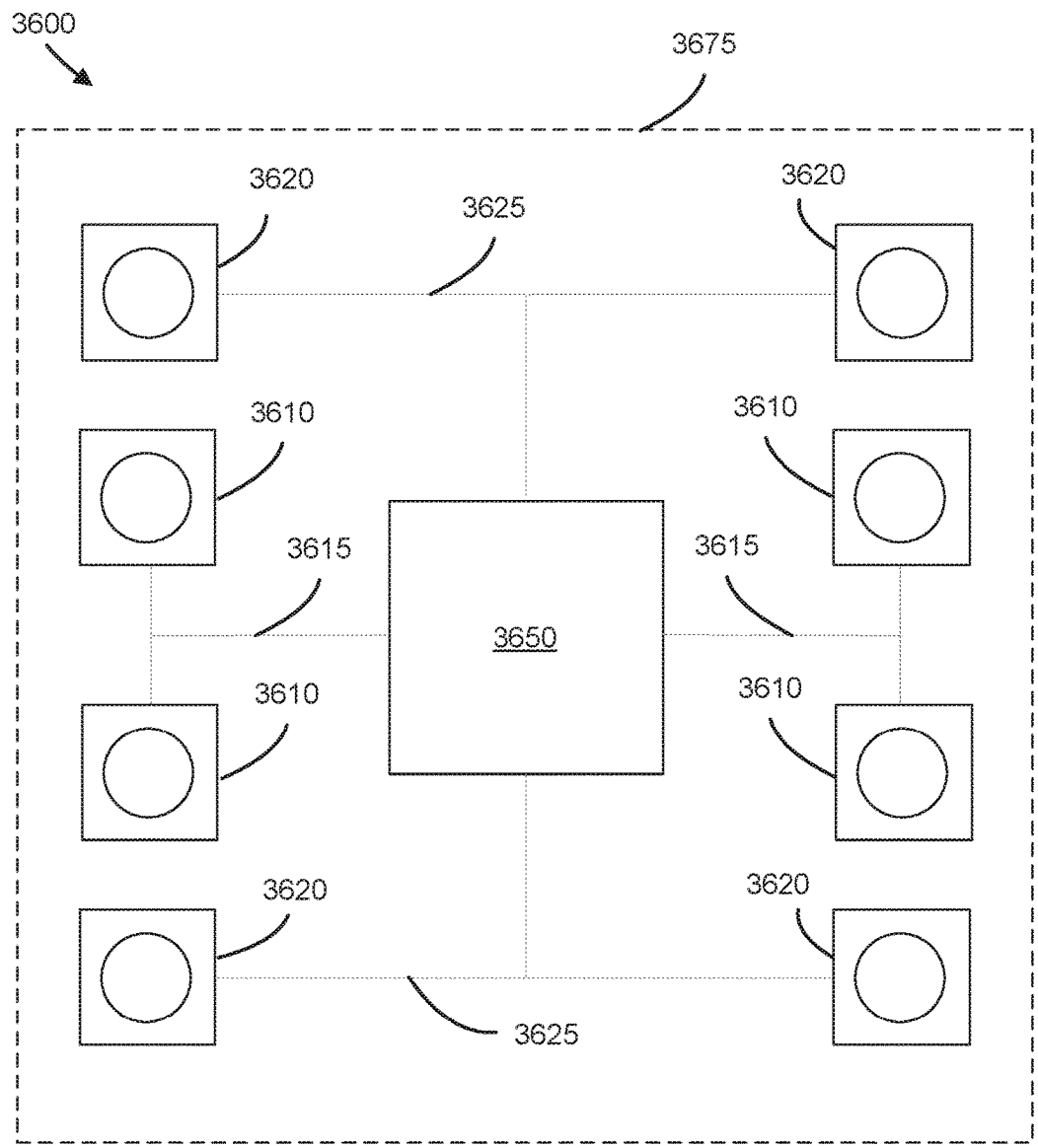
FIG. 36 illustrates a load transporting apparatus with a hydraulic system

FIG. 36 illustrates a load transporting apparatus 3600 comprising a hydraulic system 3650 fluidly coupled with a first group of transport devices 3610 by hydraulic lines 3615. Additionally, hydraulic system 3650 is fluidly coupled with a second group of transport devices 3620 by hydraulic lines 3625. Both of first group of transport devices 3610 and second group of transport devices 620 may be associated with a lift zone 3675. In some examples, lift zone 3675 may comprise a first lift zone for a base structure comprising two or more lift zones.

The first group of transport devices 3610, and the second group of transport devices 3620 may be configured to extend from a retracted position to a base surface during one or more movement steps. The hydraulic system 3650 may be configured to selectively apply hydraulic pressure to the plurality of transport devices to support the base structure above the base surface. In some examples, hydraulic system 3650 may be configured to apply an equal amount of the hydraulic pressure to the transport devices which are activated in each lift zone.

Hydraulic system 3650 may be configured to concurrently withdraw the hydraulic pressure from the first group of transport devices 3610 as the hydraulic pressure is being applied to the second group of transport devices 3620 such that an equal amount of the hydraulic pressure is continuously applied to the plurality of transport devices in any one of the lift zones, such as lift zone 3675, as the weight of the load is transferred from the first group of transport devices 3610 to the second group of transport devices 3620.

Additionally, hydraulic system 3650 may be configured to provide an equal amount of hydraulic pressure to each of the one or more extended devices within any one lift zone, such as lift zone 3675. In some examples, hydraulic system 3650 may be configured to provide a different amount of hydraulic pressure to each of the two or more lift zones in order to maintain a fixed position of an offset center of gravity of a load relative to the base structure. The two or more lift zones may comprise a first lift zone, a second lift zone, and/or a third lift zone, and with the offset center of gravity positioned above the first lift zone, hydraulic system 3650 may be configured to provide a greater amount of the hydraulic pressure to the first lift zone as compared to the second lift zone and/or to the third lift zone.

While this disclosure refers to transport devices, it is to be understood that ambulating transport system may incorporate all different types of transport devices, including hydraulic jacks, electric jacks, mechanical jacks, and pneumatic jacks.

Having described and illustrated an ambulating transport system through examples, it should be apparent that the ambulating transport system may be modified in arrangement and detail without departing from such principles. It should be understood that the scope of this disclosure is not limited to the specific examples provided within this disclosure, but includes all modifications and variations coming within the spirit and scope of the following claims.

The invention claimed is:

1. A load transporting apparatus, comprising:
   a base structure configured to support a load;
   a plurality of transport devices operably coupled to the base structure and configured to move the base structure over a base surface and support the base structure at a predetermined height above the base surface, wherein the plurality of transport devices comprise:
- a first group of transport devices configured to concurrently contact the base surface during a first movement step of the base structure, wherein the first group of transport devices supports a weight of the load during the first movement step, and wherein following the first movement step the first group of transport devices are configured to be disengaged from the base surface during a second movement step of the base structure; and
- a second group of transport devices configured to be disengaged from the base surface during the first movement step, wherein following the first movement step the second group of transport devices are configured to contact the base surface during the second movement step, wherein the weight of the load supported by the first group of transport devices is transferred from the first group of transport devices to the second group of transport devices during the second movement step, and wherein the base structure remains substantially at the predetermined height throughout both the first movement step and the second movement step.

2. The load transporting apparatus of claim 1, wherein the first group of transport devices comprise translation mechanisms configured to laterally displace the base structure along the base surface after the second group of transport devices are disengaged from the base surface.

3. The load transporting apparatus of claim 1, wherein the weight of the load is repeatedly transferred between the first group of transport devices and the second group of transport devices as the base structure alternates between the first movement step and the second movement step.

4. The load transporting apparatus of claim 1, wherein both the first group of transport devices and the second group of transport devices are distributed between three or more lift zones of the base structure, wherein each of the three or more lift zones are assigned a lifting force that collectively support the weight of the load, and wherein the assigned lifting force of each lift zone is approximately maintained as the weight of the load is transferred from the first group of transport devices to the second group of transport devices.

5. The load transporting apparatus of claim 1, wherein both the first group of transport devices and the second group of transport devices are distributed between three or more lift zones of the base structure, wherein the second group of transport devices are configured to extend from a retracted position to the base surface during the second movement step, and wherein the load transporting apparatus comprises a hydraulic system configured to apply hydraulic pressure to the second group of transport devices to support the base structure above the base surface.

6. The load transporting apparatus of claim 5, wherein an equal amount of the hydraulic pressure is applied to each of the three or more lift zones.

7. The load transporting apparatus of claim 5, wherein the hydraulic system is configured to concurrently withdraw the hydraulic pressure from the first group of transport devices as the hydraulic pressure is being applied to the second group of transport devices such that an equal amount of the hydraulic pressure is continuously applied to the plurality of transport devices in any one of the three or more lift zones as the weight of the load is transferred from the first group of transport devices to the second group of transport devices.

8. The load transporting apparatus of claim 7, wherein the second group of transport devices is configured to substantially maintain the base structure at the predetermined height when the equal amount of hydraulic pressure is applied.

9. The load transporting apparatus of claim 5, wherein the base surface comprises an uneven surface, and wherein one or more extended devices of the second group of transport devices are extended by different amounts to contact the uneven surface.

10. The load transporting apparatus of claim 9, wherein the hydraulic system is configured to distribute the hydraulic pressure between the one or more extended devices in order to support the base structure at a predetermined angle of incline with respect to the uneven base surface.

11. The load transporting apparatus of claim 9, wherein the hydraulic system is configured to provide an equal amount of hydraulic pressure to each of the one or more extended devices within one of the lift zones.

12. The load transporting apparatus of claim 9, wherein the hydraulic system is configured to provide a different amount of the hydraulic pressure to each of the three or more lift zones in order to maintain a fixed position of an offset center of gravity of the load relative to the base structure.

13. The load transporting apparatus of claim 12, wherein the three or more lift zones comprise a first lift zone, a second lift zone, and a third lift zone, wherein the offset center of gravity is positioned above the first lift zone, and wherein the hydraulic system is configured to provide a greater amount of the hydraulic pressure to the first lift zone as compared to the second lift zone and the third lift zone.

14. A load transporting apparatus, comprising:
- a base structure configured to support a load;
- a plurality of transport devices operably coupled to the base structure and configured to move the base structure over a base surface and support the base structure at a predetermined height above the base surface, wherein the plurality of transport devices comprise:
  - a first group of transport devices configured to concurrently contact the base surface during a first movement step of the base structure, wherein the first group of transport devices supports a weight of the load during the first movement step, and wherein following the first movement step the first group of transport devices are configured to be disengaged from the base surface during a second movement step of the base structure, and wherein during the second movement step the first group of transport devices are configured to be disengaged from the base surface; and
  - a second group of transport devices configured to be disengaged from the base surface during the first movement step, wherein following the first movement step the second group of transport devices are configured to contact the base surface during the second movement step, wherein the weight of the load supported by the first group of transport devices is transferred from the first group of transport devices to the second group of transport devices during the second movement step, wherein the first group of transport devices comprise translation mechanisms configured to laterally displace the base structure along the base surface after the second group of transport devices are disengaged from the base surface, and wherein the base structure remains substantially at the predetermined height throughout both the first movement step and the second movement step.

15. The load transporting apparatus of claim 14, wherein the second group of transport devices comprise additional translation mechanisms configured to laterally displace the base structure along the base surface after the first group of transport devices are disengaged from the base surface.

16. The load transporting apparatus of claim 14, wherein the second group of transport devices comprise hydraulic cylinders operably coupled to support feet that engage the base surface during the second movement step, and wherein the hydraulic cylinders are configured to raise the support feet during the first movement step in which the second group of transport devices are disengaged from the base surface.

17. The load transporting apparatus of claim 14, wherein the plurality of transport devices are additionally configured to support the base structure at a predetermined angle of incline with respect to the base surface, and wherein the base structure remains substantially at the predetermined angle of incline during both the first movement step and the second movement step.

18. A method of transporting a load, comprising:
placing a first group of transport devices in contact with a base surface during a first movement step, wherein the first group of transport devices supports a weight of the load during the first movement step, and wherein the first group of transport devices supports the load at a predetermined height above the base surface during the first movement step;
disengaging a second group of transport devices from the base surface during the first movement step;
reengaging the second group of transport devices with the base surface during a second movement step, wherein the second group of transport devices supports the load at the predetermined height above the base surface during the second movement step; and
disengaging the first group of transport devices from the base surface during the second movement step, wherein the weight of the load supported by the first group of transport devices is transferred from the first group of transport devices to the second group of transport devices during the second movement step.

19. The method of claim 18, further comprising laterally displacing, by the first group of transport devices, the load along the base surface during the first movement step after the second group of transport devices are disengaged from the base surface.

20. The method of claim 18, further comprising:
extending the second group of transport devices from a retracted position to the base surface during the second movement step;
transferring hydraulic pressure from the first group of transport devices to the extended second group of transport devices; and
applying the hydraulic pressure to the extended second group of transport devices to support the load above the base surface after the first group of transport devices are disengaged from the base surface.

\* \* \* \* \*